(12) United States Patent
Ra et al.

(10) Patent No.: US 10,289,448 B2
(45) Date of Patent: May 14, 2019

(54) BACKGROUND TRAFFIC MANAGEMENT

(71) Applicants: AT&T Intellectual Property I, L.P., Atlanta, GA (US); George Washington University, Washington, DC (US)

(72) Inventors: Moo-Ryong Ra, Basking Ridge, NJ (US); Rajesh Krishna Panta, Bridgewater, NJ (US); Tian Lan, Rockville, MD (US); Shijing Li, Arlington, VA (US)

(73) Assignees: AT&T Intellectual Property I, L.P., Atlanta, GA (US); George Washington University, Washington, DC (US)

( * ) Notice: Subject to any disclaimer, the term of this patent is extended or adjusted under 35 U.S.C. 154(b) by 233 days.

(21) Appl. No.: 15/257,378

(22) Filed: Sep. 6, 2016

(65) Prior Publication Data
US 2018/0067765 A1   Mar. 8, 2018

(51) Int. Cl.
| | |
|---|---|
| *G06F 9/46* | (2006.01) |
| *G06F 9/48* | (2006.01) |
| *H04L 12/26* | (2006.01) |

(52) U.S. Cl.
CPC ........ *G06F 9/4887* (2013.01); *H04L 43/0882* (2013.01)

(58) Field of Classification Search
None
See application file for complete search history.

(56) References Cited

U.S. PATENT DOCUMENTS

| | | | | |
|---|---|---|---|---|
| 4,744,026 A * | 5/1988 | Vanderbei | .............. | G06Q 10/06 379/112.05 |
| 5,640,563 A * | 6/1997 | Carmon | ................ | G06F 9/4887 718/102 |
| 5,905,666 A * | 5/1999 | Hoffman | ................. | G06F 17/16 700/99 |
| 6,567,840 B1 * | 5/2003 | Binns | .................... | G06F 9/4887 718/100 |
| 6,721,270 B1 * | 4/2004 | Mitra | .................... | H04L 49/205 370/230 |
| 7,302,686 B2 | 11/2007 | Togawa | | |
| 7,773,559 B2 * | 8/2010 | Chen | ..................... | H04W 28/02 370/254 |
| 7,913,256 B2 | 3/2011 | Torii et al. | | |
| 7,966,214 B2 * | 6/2011 | Denton | ............. | G06Q 10/0631 705/7.25 |
| 8,082,549 B2 * | 12/2011 | Corley, Jr. | ................ | G06F 9/52 706/19 |
| 8,443,368 B2 * | 5/2013 | Guilley | .................. | G06Q 10/06 707/609 |
| 8,607,240 B2 | 12/2013 | Brandt et al. | | |

(Continued)

OTHER PUBLICATIONS

"Need for Speed: CORA Scheduler for Optimizing Completion-Times in the Cloud," Zhe Huang, Bharath Balasubramanian, Michael Wang, Tian Lan, Mung Chiang, and Danny H.K. Tsang—Computer Communications (INFOCOM); 2015 IEEE Conference on IEEE 2015.

(Continued)

*Primary Examiner* — Hiren P Patel
(74) *Attorney, Agent, or Firm* — BakerHostetler

(57) ABSTRACT

A traffic management mechanism can employ a two-tiered approach for managing background traffic based on prioritizing tasks by remaining time flexibility then scheduling prioritized tasks using linear programming.

16 Claims, 14 Drawing Sheets

(56) References Cited

U.S. PATENT DOCUMENTS

| | | | | |
|---|---|---|---|---|
| 9,135,581 B1* | 9/2015 | Beckford | | G06Q 10/04 |
| 9,256,471 B2 | 2/2016 | Kim et al. | | |
| 9,407,676 B2* | 8/2016 | Archer | | H04L 65/60 |
| 9,621,651 B1* | 4/2017 | Ghemawat | | H04L 67/1095 |
| 9,807,002 B2* | 10/2017 | Segal | | H04L 45/56 |
| 2003/0072327 A1* | 4/2003 | Fodor | | H04L 45/00 370/468 |
| 2005/0022187 A1 | 1/2005 | Park | | |
| 2006/0101465 A1* | 5/2006 | Kato | | G05B 19/0421 718/100 |
| 2006/0218551 A1* | 9/2006 | Berstis | | G06F 9/4881 718/102 |
| 2006/0277547 A1* | 12/2006 | Abe | | G06F 9/4887 718/104 |
| 2007/0258371 A1* | 11/2007 | Chen | | H04W 72/1252 370/235 |
| 2008/0109811 A1* | 5/2008 | Krauthgamer | | G06F 1/3203 718/104 |
| 2008/0134193 A1* | 6/2008 | Corley | | G06F 9/52 718/104 |
| 2009/0037926 A1* | 2/2009 | Dinda | | G06F 9/4887 718/107 |
| 2009/0119237 A1* | 5/2009 | Triantafillidis | | G06F 17/11 706/19 |
| 2009/0320029 A1* | 12/2009 | Kottomtharayil | | G06F 9/505 718/102 |
| 2010/0162255 A1* | 6/2010 | Guilley | | G06Q 10/06 718/103 |
| 2012/0284728 A1* | 11/2012 | Tchidjo Moyo | | G06F 9/4887 718/103 |
| 2013/0179371 A1* | 7/2013 | Jain | | G06F 9/5027 705/400 |
| 2013/0290970 A1 | 10/2013 | Shah et al. | | |
| 2013/0290972 A1* | 10/2013 | Cherkasova | | G06F 9/5066 718/103 |
| 2014/0052706 A1* | 2/2014 | Misra | | G06F 17/30194 707/698 |
| 2014/0208327 A1* | 7/2014 | Cadambi | | G06F 9/5044 718/103 |
| 2014/0274104 A1* | 9/2014 | Amanna | | H04W 16/14 455/454 |
| 2014/0282572 A1* | 9/2014 | Kang | | G06F 9/4881 718/103 |
| 2015/0156114 A1* | 6/2015 | Ansari | | H04L 47/12 709/235 |
| 2015/0163157 A1* | 6/2015 | Hao | | G06F 9/5072 709/226 |
| 2015/0242275 A1 | 8/2015 | Hks et al. | | |
| 2015/0293787 A1 | 10/2015 | Bilavarn et al. | | |
| 2015/0324230 A1* | 11/2015 | Xu | | G06F 9/50 718/102 |
| 2015/0378782 A1 | 12/2015 | Hks et al. | | |
| 2016/0072723 A1* | 3/2016 | Shanmuganathan | | H04L 47/76 709/226 |
| 2016/0224939 A1* | 8/2016 | Chen | | G06Q 10/107 |

OTHER PUBLICATIONS

Huang et al.; "Need for Speed: CORA Scheduler for Optimizing Completion-Times in the Cloud"; IEEE Conf. on Computer Communication (INFOCOM); 2015; 11 pages.

* cited by examiner

BACKGROUND TRAFFIC MANAGEMENT

TECHNICAL FIELD

The technical field generally relates to, managing traffic in networks, and more particularly relates to managing background traffic in networks.

BACKGROUND

As network traffic increases and/or changes, it is necessary to reevaluate techniques for managing traffic. In one example, as more of the functionality expected by users becomes automated, there has been an increase in background traffic, which can include functions such as repairing, rebalancing, backing-up, and recovering. Many of these tasks or traffic items are non-homogeneous and may have different requirements and schedules. Background traffic is just one kind of traffic which can be managed, and its management must also be combined with management of other communication, e.g., storage traffic.

Existing techniques for managing background traffic were somewhat simple. In some embodiments, first-in-first-out (FIFO) or early-deadline-first (EDF) treatment was given to traffic. In others, linear programming (LP) was used to attempt to determine solutions for completing transmissions or tasks. However, these techniques can mis-prioritize tasks, especially where network topology and requirements are heterogeneous and dynamic. Improper prioritization, scheduling, and/or completion can interfere with performance, cause failure in time-sensitive tasks, increase latency, or otherwise violate quality-of-service (QoS) or Service Level Agreement (SLA) requirements. Some such aspects are described in industry as "noisy neighbor problems."

SUMMARY

Disclosed herein are systems and methods for traffic management in network environments. In an example, a method includes sorting a plurality of tasks according to remaining time flexibility for each of the plurality of tasks, selecting one or more prioritized tasks from the plurality of tasks for prioritization based on respective remaining time flexibility for the one or more prioritized tasks, assigning resources to the one or more prioritized tasks, and executing the one or more prioritized tasks until a task end.

In another example, a system includes a client node including computer readable media and a plurality of server nodes including computer readable media. The client node performs a background process including a plurality of tasks in combination with the plurality of server nodes. The system also includes a background process management component. The background process management component includes a sort module configured to sort the plurality of tasks according to remaining time flexibility for each of the plurality of tasks, a selection module configured to select one or more prioritized tasks from the plurality of tasks for prioritization based on respective remaining time flexibility for the one or more prioritized tasks, and an assignment module configured to assign resources to the one or more prioritized tasks.

In another example, a method includes a) sorting a plurality of tasks according to remaining time flexibility for each of the plurality of tasks, b) selecting one or more prioritized tasks from the plurality of tasks for prioritization based on respective remaining time flexibility for the one or more prioritized tasks, and c) assigning resources to the one or more prioritized tasks using a linear programming model. The linear programming model can solve a resource equation as constrained by component constraints. The method also includes d) executing the one or more prioritized tasks until a task end. The task end is task completion or expiration of remaining time flexibility. The method also includes e) recycling to step (a) based on the task end.

In embodiments, non-transitory computer readable media can store instructions for performing or causing aspects disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Aspects of the systems and methods described herein are detailed more fully with reference to the accompanying drawings and accompanying examples. In the following description, for purposes of explanation, numerous specific details are set forth in order to provide an understanding of the variations in implementing the disclosed technology. However, the instant disclosure may take many different forms and should not be construed as limited to the examples set forth herein. When practical, like numbers refer to like elements throughout.

DETAILED DESCRIPTION

Figure 1:
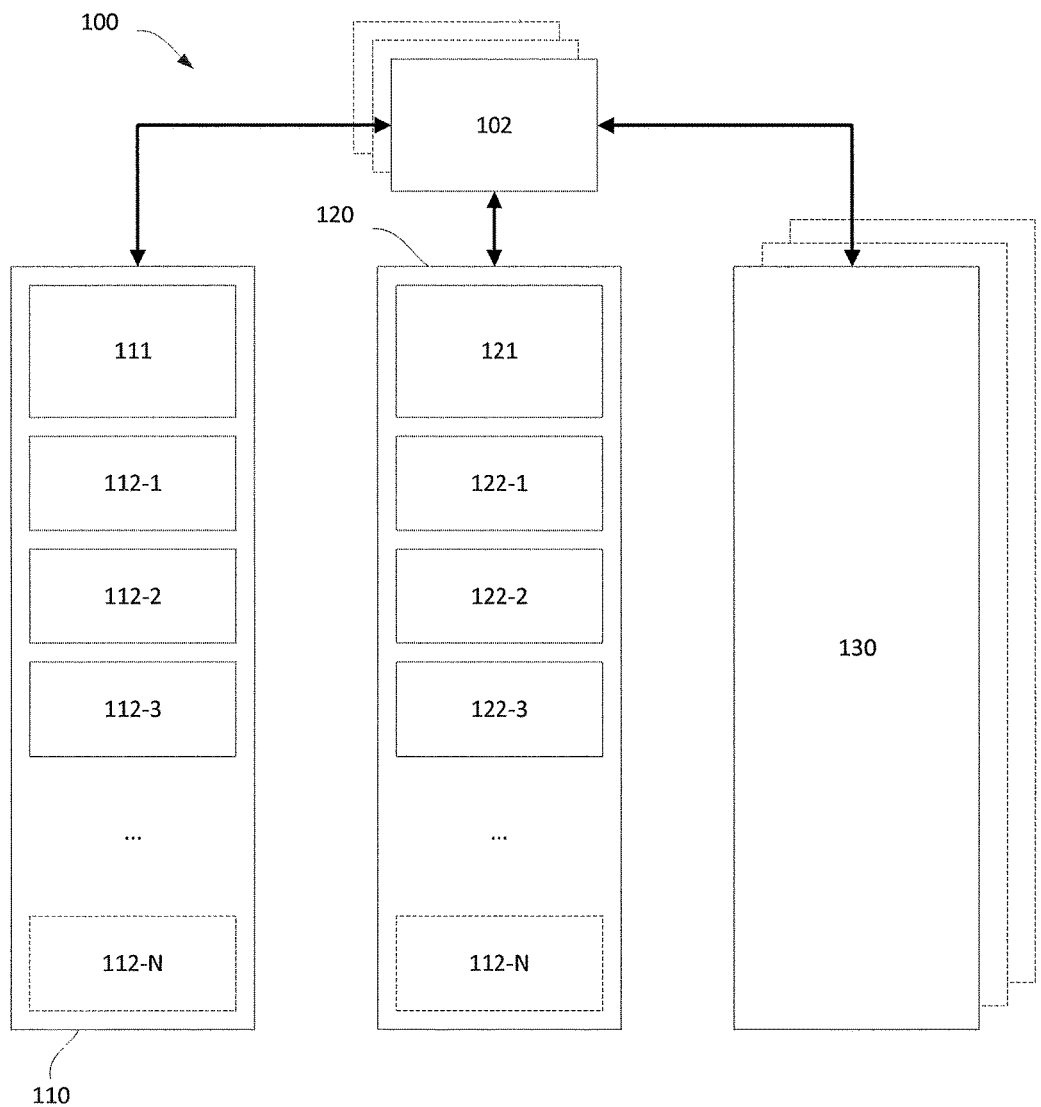
FIG. 1 illustrates an example environment for network traffic management.

Heterogeneous and complex topology and resource requirements make deadline-focused resource management challenging. Previous techniques such as FIFO and LP were reasonably effective in homogeneous environments, but may not produce satisfactory results, especially with the increasing volume and complexity of heterogeneous background traffic for functions such as repair, rebalance, backup, and recovery. Disclosed herein are techniques for managing such traffic in data centers and other environments. Embodiments can employ a linear programming for selected tasks (LPST) technique to coordinate background traffic for different tasks while enforcing traffic deadlines. LPST techniques consider task deadline, network topology, chunk placement, and time-varying resource availability in task management solutions. In tested scenarios, LPST can provide task management seven to seventy times better than heuristics which treat infrastructure as a collection of homogeneous resources, and forty-five to sixty-six percent better than other algorithms considering network topology.

LPST does this by jointly solving a chunk selection problem, a bandwidth allocation problem including apportioning bandwidth at top-of-rack (TOR) and aggregation switches, and a scheduling problem including enforcement of respective task deadlines. In an erasure-coding example, k out of n chunks can be selected from sources which are among the most-idle servers and racks. The tasks can be sorted according to remaining time flexibility to filter tasks for urgency. The tasks selected after filtering (e.g., "admitted tasks") can thereafter be scheduled and allocated bandwidth using linear programming.

While aspects herein are directed to background traffic for ease of explanation, it is understood that other traffic, such as, e.g., stage traffic, can also be managed using techniques disclosed herein.

As used herein, a "source" device or storage element can include data or memory for duplication or backup. A "destination" is the storage on which the source data is replicated or reproduced. Background operations can have a file or multiple data portions broken into pieces, and the pieces broken into chunks (e.g., under erasure-coding arrangements), facilitating redundancy, flexibility, and security. For example, backup can be conducted in a distributed manner where multiple destinations are used for partial copies in overlapping, and in embodiments, non-matching chunks with some common data. In this fashion, it is unnecessary to provide full copies in any one location, and chunks can be recovered simultaneously for faster receipt where the source or other devices need the backed-up data. Because some common data is included in various chunks, all chunks need not be recovered to fully reconstruct the original data. In a more specific embodiment using erasure-coding, an (n, k) erasure-code can be employed wherein a file is split into k pieces encoded into n chunks, making the file retrievable from any k of n storage nodes. In an embodiment, 9 chunks are stored at different backup locations, but only 6 need be recovered to reconstruct the data (i.e., n=9 and k=6). Accordingly, if any one system is experiencing unusually high traffic or is taken offline, full recovery is still possible. Traffic management techniques herein can facilitate control of (in the preceding example) definition of the chunks, delivery of the chunks to destinations, and recovery of the chunks from the destinations. Given these arrangements, systems employing erasure-coding (or similar techniques) create additional variables and considerations not present in all previous network topologies and communication architectures. Erasure coding arrangements can include, e.g., Maximum-Distance-Separable erasure-code.

As used herein, "remaining time flexibility" or "RTF" is the maximum length of time before a task becomes infeasible in view of its deadline, current network topology, data placement, bandwidth constraints, and/or other task- or environment-dependent variables. "Component constraints" are various constraints influencing network capability based on hardware, software, and topology, and can include aspects such as link capacity, processor speed, memory available, et cetera. "Link capacity" can refer to the capacity of various links in network traffic, including, but not limited to, server bandwidth capacity, top-of-rack bandwidth capacity, aggregator bandwidth capacity, and others. "Modules" can be hardware, software, combinations thereof.

FIG. 1 illustrates an example block diagram of a system 100 on which aspects herein can be implemented. System 100 shows an arrangement of servers and related components for which traffic can be managed according to aspects herein. The arrangement shows one or more aggregator components 102, which are used to facilitate and/or manage communication between racks of servers 110, 120, 130, et cetera. Rack of servers 110 can include top-of-rack component 111 (e.g., a TOR switch), which facilitates and/or manages communication between servers 112-1, 112-2, 112-3, 112-N, et cetera. Specifically, if server 112-1 has traffic to communicate with, e.g., server 112-3, the traffic is sent to the top-of-rack component 111 from server 112-1 for routing before arriving at server 112-3. Likewise, rack of servers 120 can include top-of-rack component 121 which facilitates and/or manages communication between servers 122-1, 122-2, 122-3, 122-N, et cetera. Rack of servers 130 and other racks of servers can include similar elements. If server 112-1 has traffic to communicate to, e.g., server 122-2, the traffic is sent to top-of-rack component 111, then to aggregator 102, then to top-of-rack component 121, and finally arrives at 122-2 therefrom. Each communication link on this chain, and others in system 100, have a capacity. Other elements of system 100 can include aggregator switches. In embodiments, any number of aggregators may be employed by system 100 or similar systems, and any one such aggregator may be operatively coupled with two or more (up to but not necessarily all) racks of servers in the system. Racks of servers may or may not include top-of-rack components, and may include any number of servers, which can be different from the number of servers in other racks of servers.

A constraint in traffic management and task scheduling includes the bandwidth capacity of system 100 and each element therein. The entirety of system 100, as well as aggregators, racks, top-of-rack components, and servers therein can all be evaluated and/or managed for traffic management aspects disclosed herein.

Figure 2:
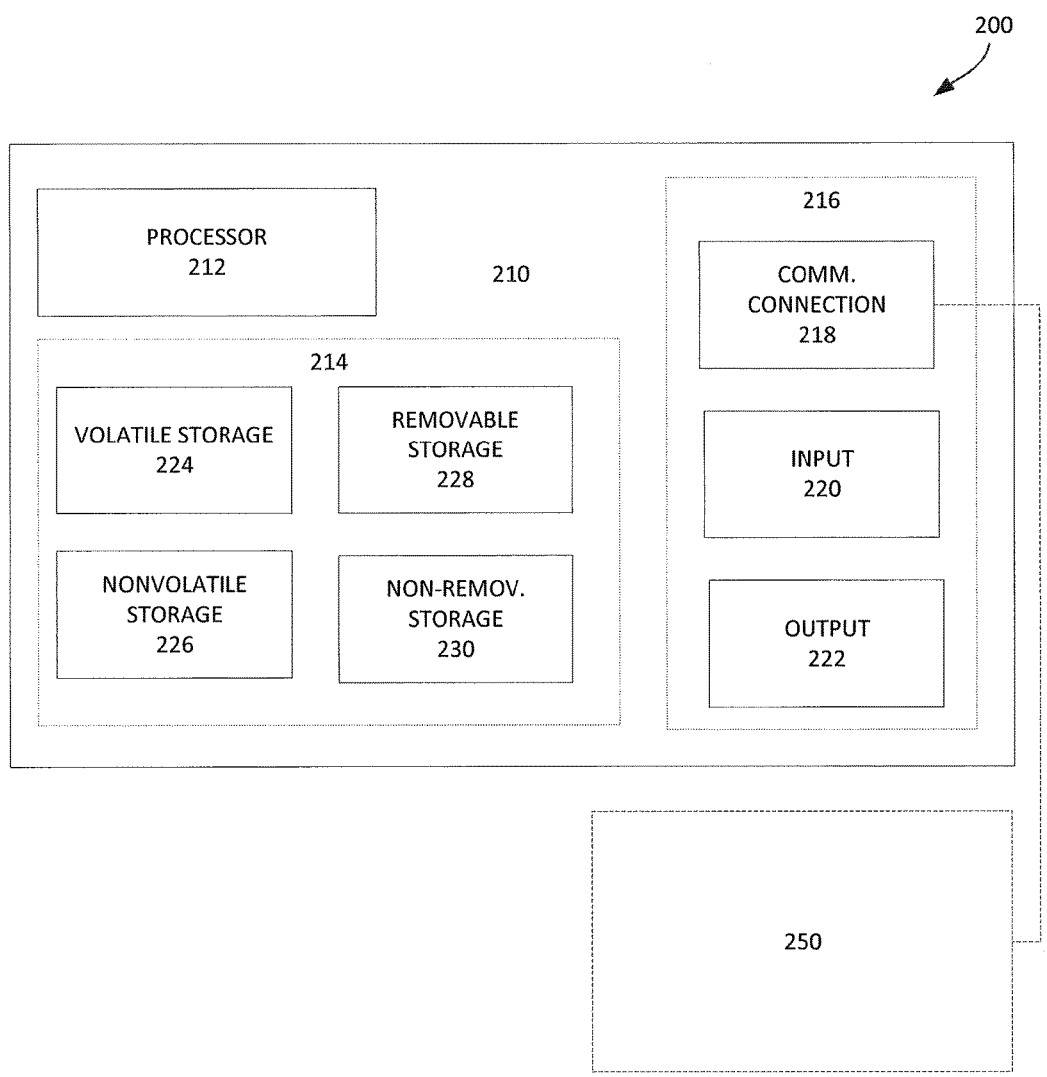
FIG. 2 illustrates an example system including at least one network device functional in example network environments.

To provide additional details as to the block diagram of FIG. 1, FIG. 2 depicts a block diagram of a system 200 including a network device 210 that may be connected to or comprise a component of system 100 (e.g., server, top-of-rack component, or aggregator). Network device 210 may comprise hardware or a combination of hardware and software. The block diagram depicted in FIG. 2 is for purposes of example and illustration, and not intended to imply a limitation to a specific implementation or configuration. Thus, network device 210 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 210 may comprise a processor 212 and a memory 214 coupled to processor 212. Memory 214 may contain executable instructions that, when executed by processor 212, cause processor 212 to effectuate operations associated with mapping wireless signal strength. As evident from the description herein, network device 210 is not to be construed as software per se.

In addition to processor 212 and memory 214, network device 210 may include an input/output system 216. Processor 212, memory 214, and input/output system 216 may be coupled together to allow communications therebetween. Each portion of network device 210 may comprise circuitry for performing functions associated with each respective portion. Thus, each portion may comprise hardware, or a combination of hardware and software. Accordingly, each portion of network device 210 is not to be construed as software per se. Input/output system 216 may be capable of receiving or providing information from or to a communications device or other network entities configured for telecommunications. For example input/output system 216 may include a wireless communications (e.g., 3G/4G/GPS) card. Input/output system 216 may be capable of receiving or sending video information, audio information, control information, image information, data, or any combination thereof. Input/output system 216 may be capable of transferring information with network device 210. In various configurations, input/output system 216 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 216 may comprise a Wi-Fi finder, a two-way GPS chipset or equivalent, or the like, or a combination thereof.

Input/output system 216 of network device 210 also may contain a communication connection 218 that allows network device 210 to communicate with other devices, network entities, or the like. Communication connection 218 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 216 also may include an input device 320 such as keyboard, mouse, pen, voice input device, or touch input device. Input/output system 216 may also include an output device 322, such as a display, speakers, or a printer.

Processor 212 may be capable of performing functions associated with telecommunications, such as functions for processing broadcast messages, as described herein. For example, processor 212 may be capable of, in conjunction with any other portion of network device 210, determining a type of broadcast message and acting according to the broadcast message type or content, as described herein.

Memory 214 of network device 210 may comprise a storage medium having a concrete, tangible, physical structure. As is known, a signal does not have a concrete, tangible, physical structure. Memory 214, as well as any computer-readable storage medium described herein, is not to be construed as a signal. Memory 214, as well as any computer-readable storage medium described herein, is not to be construed as a transient signal. Memory 214, as well as any computer-readable storage medium described herein, is not to be construed as a propagating signal. Memory 214, as well as any computer-readable storage medium described herein, is to be construed as an article of manufacture.

Memory 214 may store any information utilized in conjunction with telecommunications. Depending upon the exact configuration or type of processor, memory 214 may include a volatile storage 314 (such as some types of RAM), a nonvolatile storage 316 (such as ROM, flash memory), or a combination thereof. Memory 214 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 210. Memory 214 may comprise executable instructions that, when executed by processor 212, cause processor 212 to effectuate operations to map signal strengths in an area of interest.

The functionality to facilitate telecommunications via a telecommunications network may reside in one or combination of network devices 210 and/or 250. Network device 250 may be the same as or different from network device 210, and include some or all of the elements of, or additional elements not included in, network device 210. Network device 210 depicted in FIG. 2 may represent or perform functionality of an appropriate network device 210, or combination of network devices 210 and/or 250, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof.

Figure 3:
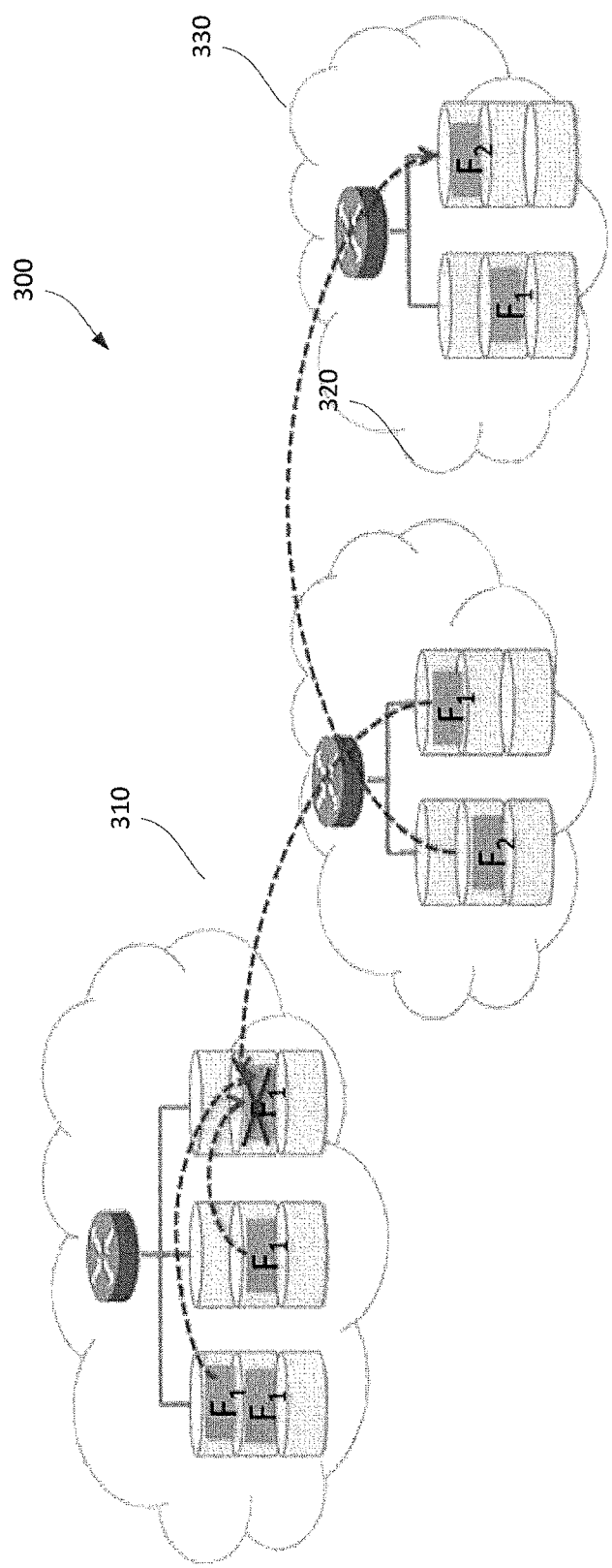
FIG. 3 illustrates an example network environment including visualization of file traffic in the network.

FIG. 3 illustrates an example system 300 illustrating aspects which can be managed according to the disclosures herein. System 300 includes clusters 310, 320, and 330, including aspects which can be appreciated in view of FIG. 2. In embodiments, system 300 can be an erasure-coded system. However, various other systems can be employed. Two files, F1 and F2, are involved in background traffic, to include, e.g., data chunk selection and chunk replication for F1, and file replication for F2. Chunk selection for F1 can occur on, e.g., a plurality of servers and/or racks of servers in cluster 310, while replication can occur between cluster 310 and cluster 320 for delivery of data chunks from file F1, and between cluster 320 and cluster 330 for delivery of file F2. Tasks for resource (e.g., bandwidth) scheduling include the data chunk selection and management, and replication across clusters.

Figure 4A:
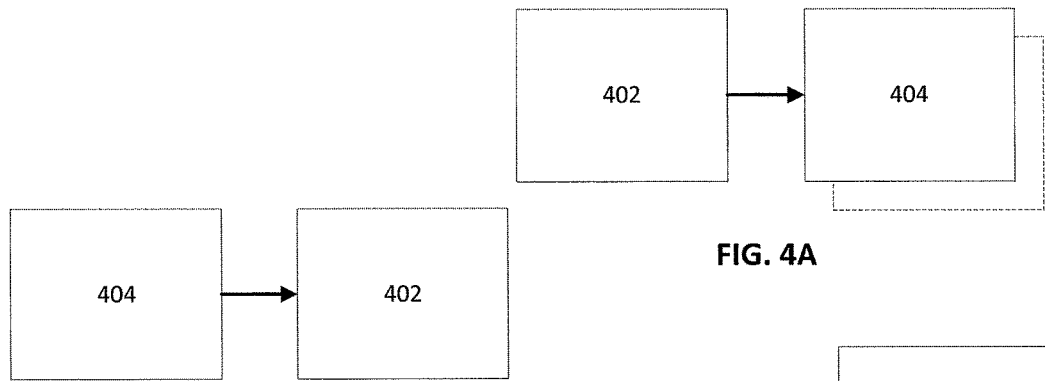
FIGS. 4A to 4D illustrate details relating to file traffic in a network.
Figure 4B:
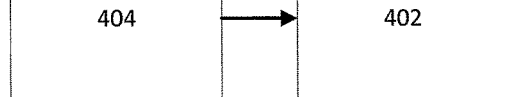

FIGS. 4A to 4D illustrate example techniques for aspects to be managed using techniques herein. FIG. 4A shows a source 402 which transmits a file to destination 404 in replication for backup. The transferring of the file from source 402 to destination 404 can be managed according to LPST or other techniques described herein. In embodiments, there can be more than one destination 404, both of which receive the file (either from, e.g., source 402 or another destination node). FIG. 4B shows a recovery technique according to a replication arrangement like 4A, in which destination 404 now returns the file to source 402 in recovery.

Figure 4C:
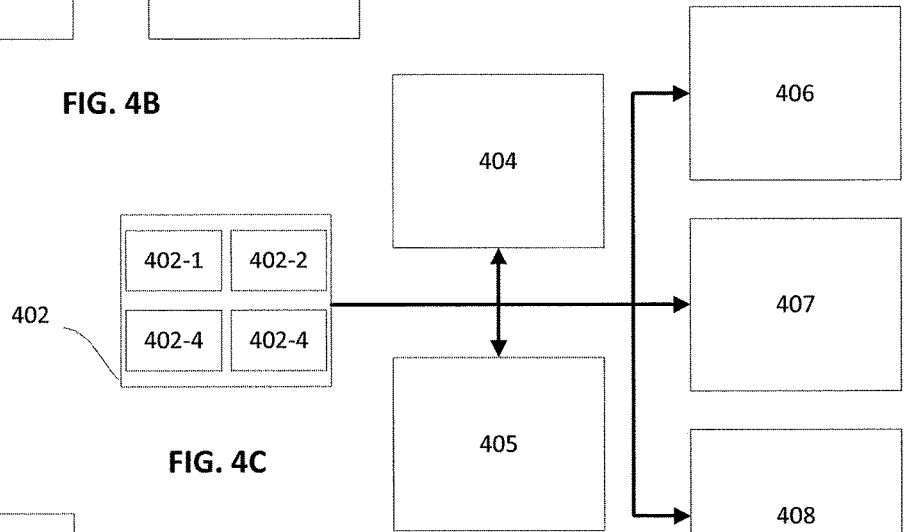
Figure 4D:
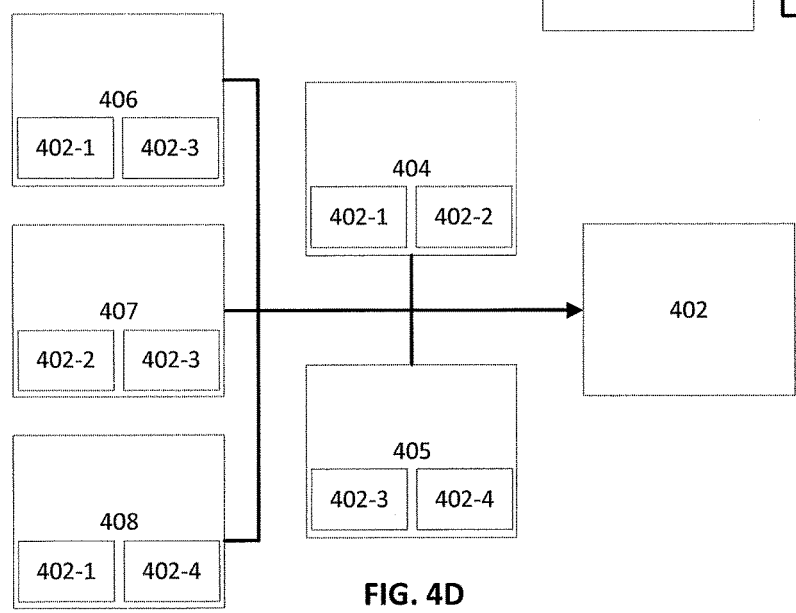

FIG. 4C illustrates a backup scheme using chunked data operations. Source 402 has a file encoded into four chunks (402-1, 402-2, 402-3, and 402-4) based on pieces of the original file. Source 402 can provide the four chunks to destinations 404-408. FIG. 4D illustrates how the chunks may be stored in different manners on different destinations 404-408, such that the entire file can be recovered piecemeal even with some destinations offline. Task management can relate to defining file pieces, encoding file chunks (402-1 to 402-4), transferring the file chunks from source 402 to destinations 404-408, and recovering the file chunks from a subset of destinations 404-408.

Figure 5:
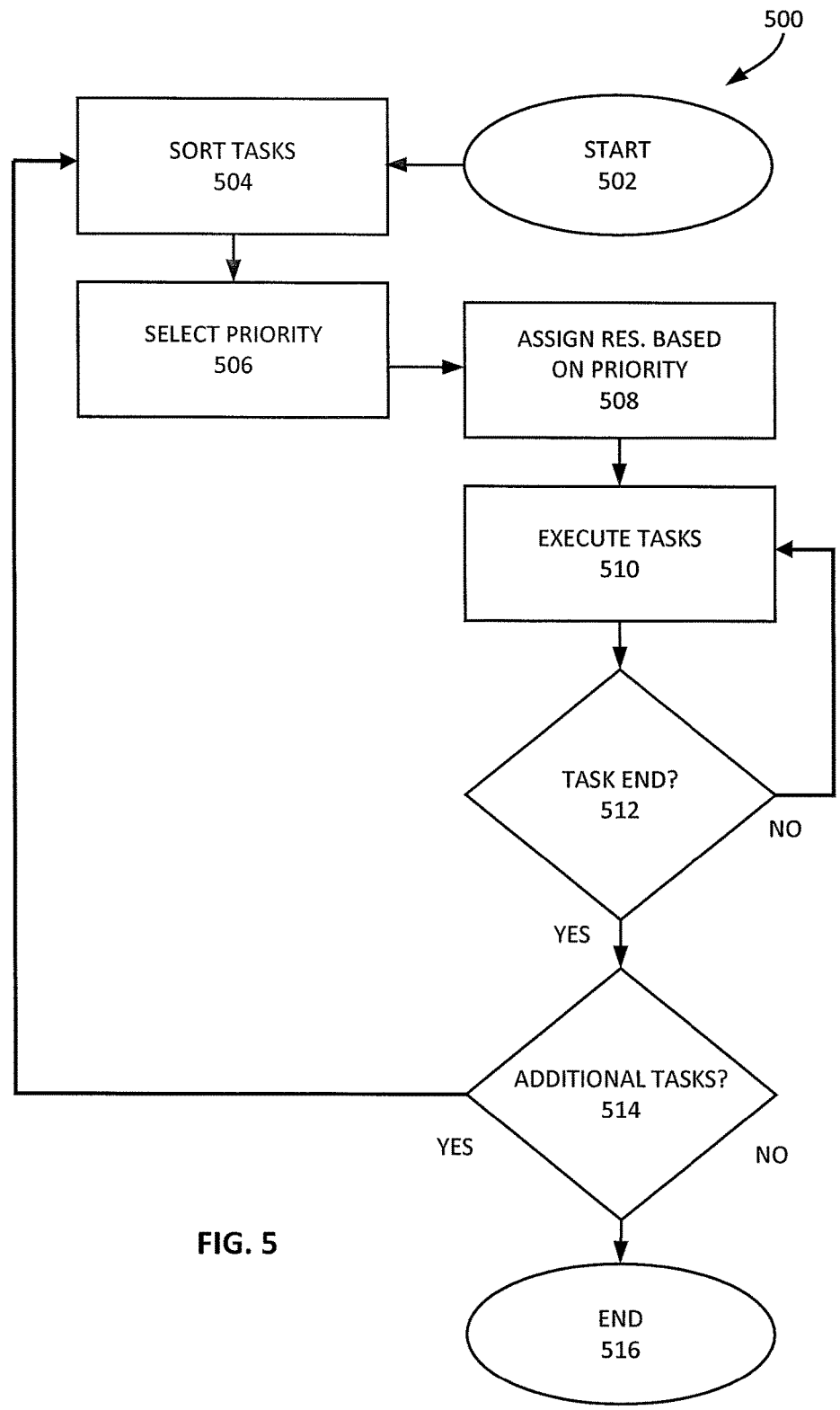
FIG. 5 illustrates an example methodology for managing traffic in a network.

In view of these example topologies and processes, FIG. 5 illustrates a methodology 500 for assigning bandwidth to manage traffic in a network environment. In embodiments, the traffic can be background traffic including repair, rebalance, backup, and recovery operations. Background traffic can strain capacity after, e.g., loss of an erasure-coded chunk, as repair of a data chunk of x bytes generates kx bytes of network traffic in an (n,k) erasure-coded system.

Methodology 500 begins at 502 where a plurality of tasks are pending. New tasks can arrive in random or structured manners, and methodology 500 will assess the tasks present at 502. At 504, the tasks are sorted for priority. In embodiments, the priority can be based on RTF for each respective task. At 502 or later in methodology 500, tasks can be identified as a series of subtasks (which can, but need not, correspond to a number of chunks related to the task). A least required bandwidth (LRB) can also be determined for each subtask (or task) describing the minimum bandwidth necessary to complete the subtask (or task) within the deadline. These values can be used as constraints at various points in methodology 500.

Once tasks are sorted, prioritized tasks (admitted tasks, e.g., at least a subset of the sorted tasks admitted for action) are selected at 506. Selection can be made by, e.g., selecting an arbitrary (constant or changing) number of tasks from the sorted arrangement, selecting tasks from a band of priority based on a threshold (e.g., RTF below threshold value), or by other techniques. In an example, relatively urgent tasks having slackness or RTF below a certain threshold can be selected for the subset. RTF or slackness can be quantified according to:

$$f_n = \text{deadline} - \text{present time} - \frac{v_n}{\text{link capacity}}$$

where $f_n$ is the RTF and $v_n$ is a file volume for transmission. In a specific embodiment, the threshold can be based on performance of the system, or historical or realtime data related to iterations of methodology 500 or similar techniques. An example selection procedure can be defined by:
for a sorted array $(A_1, A_2 \ldots A_n)$ based on $f_n$ (RTF), and for i=1 to n $$b_i = \frac{v_i}{d_i - t_0}$$

if residual links can support $A_i$ then ST←ST ∩ $A_i$
else return ST
where the current time is $t_0$, ST is the set of all selected tasks, $A_i$ is a given task, $v_i$ is a file volume associated with the task, $d_i$ is the deadline for task i, and $b_i$ is the bandwidth assigned for the task. In embodiments, all tasks are selected but prioritization among the selection is understood based on the sorting.

At 508, resources can be assigned to the subset of tasks selected based on priority. In embodiments, resources are assigned to all tasks, but prioritized according to sort order. In embodiments, less than all tasks receive resources based on priority (e.g., tasks outside priority have RTF allowing assignment in later iteration of methodology). In embodiments, resource assignment can be completed using linear programming. In specific embodiments, resource assignment can be completed using linear programming wherein the objective function is bandwidth utilization and function constraints include the resources available based on topology. Bandwidth can be assigned to maximize network link utilization in view of constraints and tasks (or subtasks). In embodiments, resources available based on topology can include bandwidth available to servers, top-of-rack components, aggregators, et cetera. An example bandwidth assignment arrangement can be defined according to:

$$\max \sum_{z=1}^{m} b_z$$

s.t.

∀ link l, $$\sum_z b_z \leq C_l$$

∀ $A_z \in ST$, $$b_z \geq \frac{v_n}{d_n - t_0}$$

where $z_i$ is whether task i is complete (if task end has occurred), $C_l$ is link capacity, $A_z$ is a given set of tasks, and m is the number of tasks.

At 510, at least the subset of tasks is executed using the resources assigned. This bandwidth arrangement can continue until one task is finished. Execution can be concurrent or staggered, and tasks can be notated as executing, waiting (e.g., no executing started but scheduled to start), or finished. Solutions can instruct what executes and what waits based on the link capacity required to complete the more emergent (lower RTF or slackness) tasks. In an embodiment, if one or more tasks among the subset of tasks cannot be completed before its deadline or with resources allocated, the transmission state can be recorded and the processes (of the failing task or of multiple tasks) can be stopped. In this embodiment including a task failure based on exceeding RTF or resources, methodology 500 can recycle to re-sort, prioritize, and assign based on an updated state.

Assuming no tasks fails, methodology 500 proceeds to 512 where tasks are monitored for completion. If tasks are not completed, execution continues at 510. If one or more tasks are completed, a determination is made at 514 as to whether additional tasks are still pending. If the deteunination at 514 returns positive, methodology 500 recycles to 504 where additional tasks are sorted to begin reassigning resources in view of the updated task state. If the determination at 514 returns negative, methodology 500 proceeds to 516 where the method ends. Methodology 500 can be repeated in cycle or upon the arrival and/or departure of any task.

FIGS. 6A to 6L show comparisons of outcomes based on resource management techniques herein and other techniques. An LPST technique as disclosed herein was compared against EDF, disjointed EDF, FIFOFB (full bandwidth), FIFOLB (least required bandwidth), an LPAll (LP applied to arrange all tasks). For the modeling conducted to produce FIGS. 6A to 6L, a standard topologies were used for a small network and large network. The small network included one aggregator, one rack, and ten servers in the rack. The large network included one aggregator, three racks, and ten servers per rack for a total of thirty servers. A simulation generated tasks over one week using both constant arrival and Poisson arrival. Arrival rates varied from dense (one task per ten minute interval) to sparse (one task per hour).

Figure 6A:
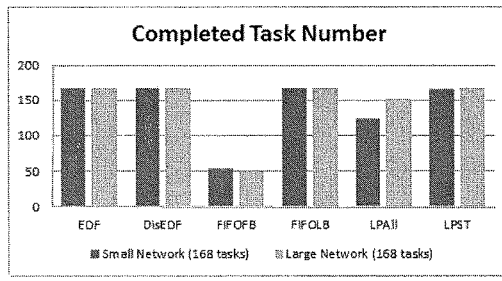
FIGS. 6A to 6L include graphs illustrating the performance of various traffic management techniques.
Figure 6B:
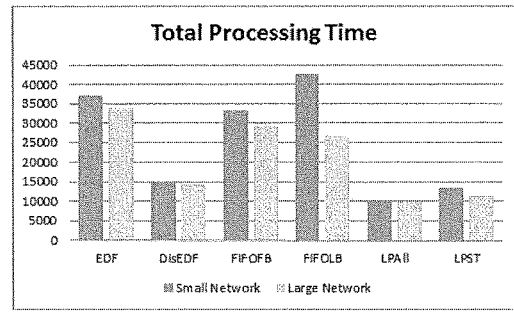
Figure 6C:
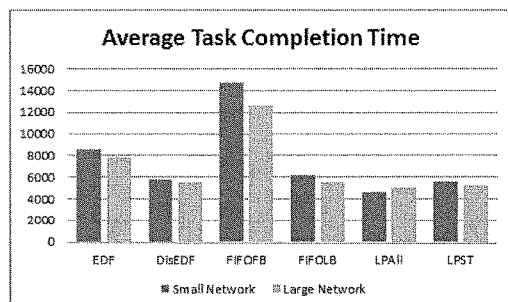
Figure 6D:
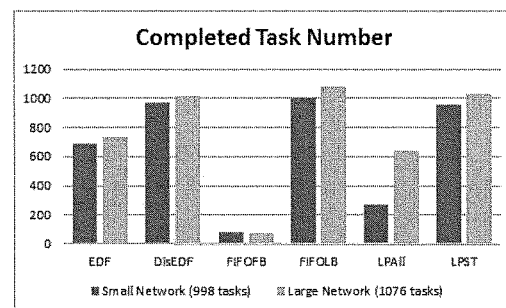
Figure 6E:
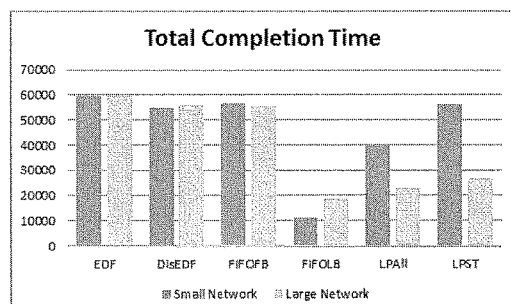
Figure 6F:
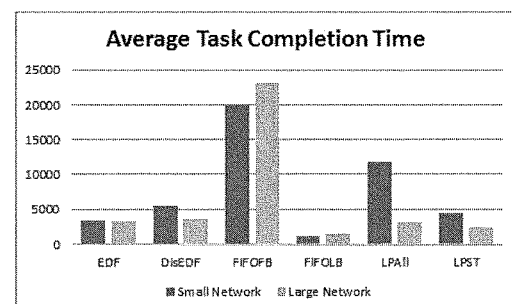
Figure 6G:
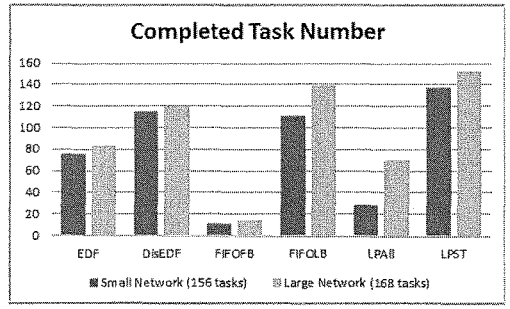
Figure 6H:
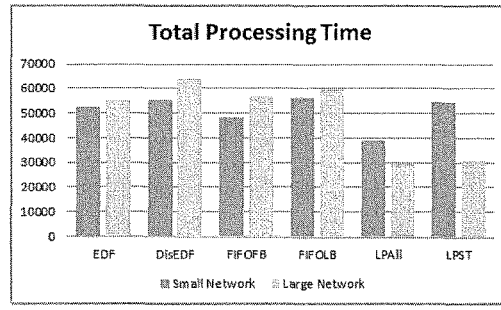
Figure 6I:
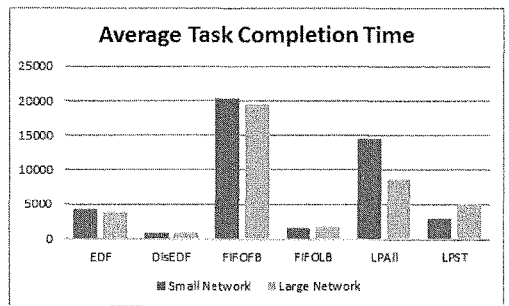
Figure 6J:
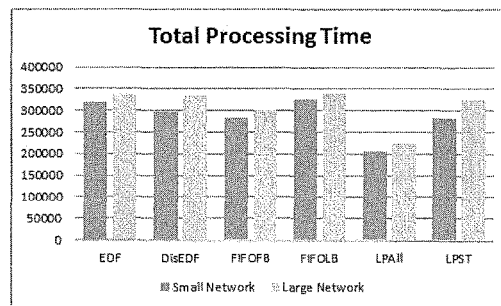
Figure 6K:
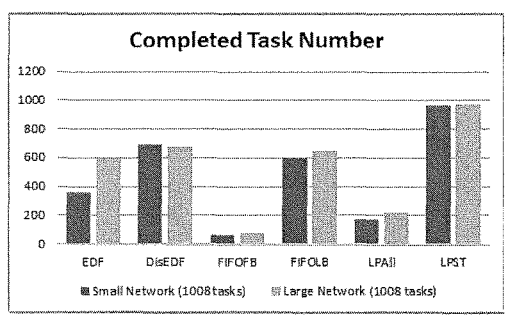
Figure 6L:
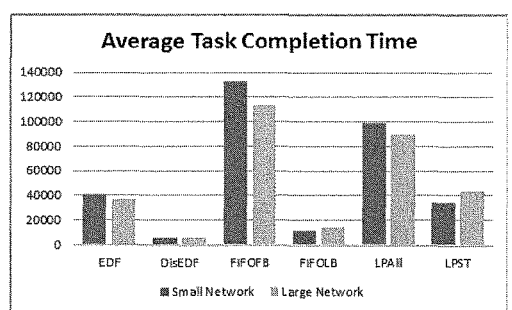

As can be appreciated from the figures, LPST had consistent high performance, exceeding or nearly matching other techniques in total number of completed tasks, total processing time, and average task completion time. In this regard, FIGS. 6A, 6B, and 6C show results grouped by algorithm under sparse constant task arrival conditions. FIGS. 6D, 6E, and 6F show results grouped by algorithm under dense Poisson task arrival conditions. FIGS. 6G, 6H, and 6I show results grouped by algorithm under dense constant task arrival conditions. And FIGS. 6J, 6K, and 6L show results grouped by algorithm under dense Poisson task arrival conditions. Further testing also included Dis-EDF, Dis-EDF-S, Dis-FIFO, and other algorithms, which LPST also improved upon, because only LPST considers source selection, network bandwidth allocation, and deadline-aware scheduling in combination.

Examples of sources of traffic which might be handled by systems and methods described above are set forth below in FIGS. 7-13. FIGS. 7-13 should be construed as non-limited examples, and alternative sources of data or traffic for management in accordance with the disclosures herein are within the scope of the claims. In embodiments, a device such as network device 210 can couple with LTE networks or others as described hereafter.

Figure 7:
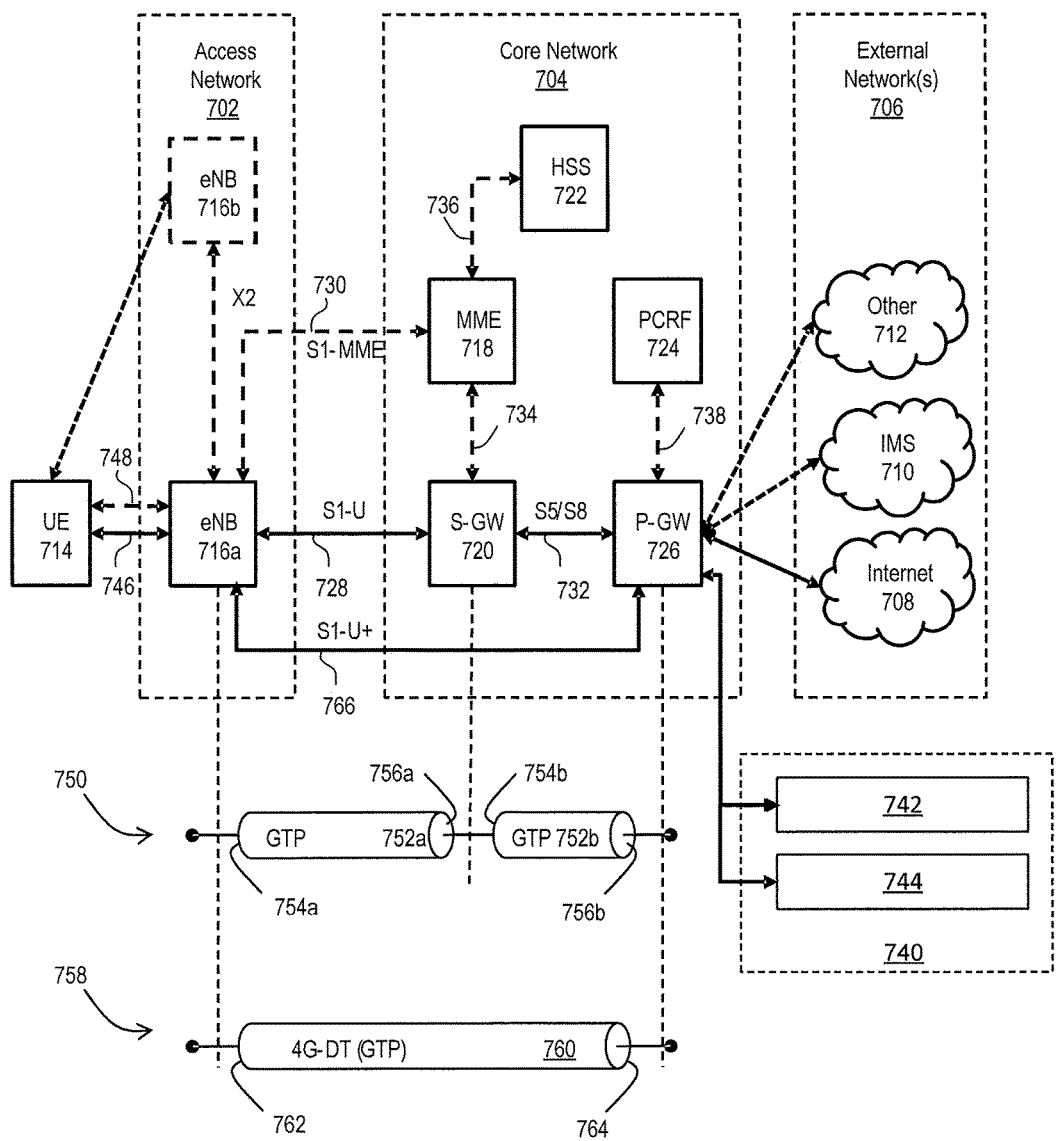
FIG. 7 depicts an exemplary communication system that provide wireless telecommunication services over wireless communication networks.

FIG. 7 illustrates a functional block diagram depicting one example of an LTE-EPS network architecture 700 related to the current disclosure. In particular, the network architecture 700 disclosed herein is referred to as a modified LTE-EPS architecture 700 to distinguish it from a traditional LTE-EPS architecture.

An example modified LTE-EPS architecture 700 is based at least in part on standards developed by the 3rd Generation Partnership Project (3GPP), with information available at www.3gpp.org. In one embodiment, the LTE-EPS network architecture 700 includes an access network 702, a core network 704, e.g., an EPC or Common BackBone (CBB) and one or more external networks 706, sometimes referred to as PDN or peer entities. Different external networks 706 can be distinguished from each other by a respective network identifier, e.g., a label according to DNS naming conventions describing an access point to the PDN. Such labels can be referred to as Access Point Names (APN). External networks 706 can include one or more trusted and non-trusted external networks such as an internet protocol (IP) network 708, an IP multimedia subsystem (IMS) network 710, and other networks 712, such as a service network, a corporate network, or the like.

Access network 702 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 702 can include one or more communication devices, commonly referred to as UE 714, and one or more wireless access nodes, or base stations 716a, 716b. During network operations, at least one base station 716 communicates directly with UE 714. Base station 716 can be an evolved Node B (e-NodeB), with which UE 714 communicates over the air and wirelessly. UEs 714 can include, without limitation, wireless devices, e.g., satellite communication systems, portable digital assistants (PDAs), laptop computers, tablet devices and other mobile devices (e.g., cellular telephones, smart appliances, and so on). UEs 714 can connect to eNBs 716 when UE 714 is within range according to a corresponding wireless communication technology.

UE 714 generally runs one or more applications that engage in a transfer of packets between UE 714 and one or more external networks 706. Such packet transfers can include one of downlink packet transfers from external network 706 to UE 714, uplink packet transfers from UE 714 to external network 706 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 704, e.g., according to parameters, such as the QoS.

Core network 704 uses a concept of bearers, e.g., EPS bearers, to route packets, e.g., IP traffic, between a particular gateway in core network 704 and UE 714. A bearer refers generally to an IP packet flow with a defined QoS between the particular gateway and UE 714. Access network 702, e.g., E UTRAN, and core network 704 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 704 includes various network entities, such as MME 718, SGW 720, Home Subscriber Server (HSS) 722, Policy and Charging Rules Function (PCRF) 724 and PGW 726. In one embodiment, MME 718 comprises a control node performing a control signaling between various equipment and devices in access network 702 and core network 704. The protocols running between UE 714 and core network 704 are generally known as Non-Access Stratum (NAS) protocols.

For illustration purposes only, the terms MME 718, SGW 720, HSS 722 and PGW 726, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 720 routes and forwards all user data packets. SGW 720 also acts as a mobility anchor for user plane operation during handovers between base stations, e.g., during a handover from first eNB 716a to second eNB 716b as may be the result of UE 714 moving from one area of coverage, e.g., cell, to another. SGW 720 can also terminate a downlink data path, e.g., from external network 706 to UE 714 in an idle state, and trigger a paging operation when downlink data arrives for UE 714. SGW 720 can also be configured to manage and store a context for UE 714, e.g., including one or more of parameters of the IP bearer service and network internal routing information. In addition, SGW 720 can perform administrative functions, e.g., in a visited network, such as collecting information for charging (e.g., the volume of data sent to or received from the user), and/or replicate user traffic, e.g., to support a lawful interception. SGW 720 also serves as the mobility anchor for interworking with other 3GPP technologies such as universal mobile telecommunication system (UMTS).

At any given time, UE 714 is generally in one of three different states: detached, idle, or active. The detached state is typically a transitory state in which UE 714 is powered on but is engaged in a process of searching and registering with network 702. In the active state, UE 714 is registered with access network 702 and has established a wireless connection, e.g., radio resource control (RRC) connection, with eNB 716. Whether UE 714 is in an active state can depend on the state of a packet data session, and whether there is an active packet data session. In the idle state, UE 714 is generally in a power conservation state in which UE 714 typically does not communicate packets. When UE 714 is idle, SGW 720 can terminate a downlink data path, e.g., from one peer entity 706, and triggers paging of UE 714 when data arrives for UE 714. If UE 714 responds to the page, SGW 720 can forward the IP packet to eNB 716a.

HSS 722 can manage subscription-related information for a user of UE 714. For example, tHSS 722 can store information such as authorization of the user, security requirements for the user, quality of service (QoS) requirements for the user, etc. HSS 722 can also hold information about external networks 706 to which the user can connect, e.g., in the form of an APN of external networks 706. For example, MME 718 can communicate with HSS 722 to determine if UE 714 is authorized to establish a call, e.g., a voice over IP (VoIP) call before the call is established.

PCRF 724 can perform QoS management functions and policy control. PCRF 724 is responsible for policy control decision-making, as well as for controlling the flow-based charging functionalities in a policy control enforcement function (PCEF), which resides in PGW 726. PCRF 724 provides the QoS authorization, e.g., QoS class identifier and bit rates that decide how a certain data flow will be treated in the PCEF and ensures that this is in accordance with the user's subscription profile.

PGW 726 can provide connectivity between the UE 714 and one or more of the external networks 706. In illustrative network architecture 700, PGW 726 can be responsible for IP address allocation for UE 714, as well as one or more of QoS enforcement and flow-based charging, e.g., according to rules from the PCRF 724. PGW 726 is also typically responsible for filtering downlink user IP packets into the different QoS-based bearers. In at least some embodiments, such filtering can be performed based on traffic flow templates. PGW 726 can also perform QoS enforcement, e.g., for guaranteed bit rate bearers. PGW 726 also serves as a mobility anchor for interworking with non-3GPP technologies such as CDMA2000.

Within access network 702 and core network 704 there may be various bearer paths/interfaces, e.g., represented by solid lines 728 and 730. Some of the bearer paths can be referred to by a specific label. For example, solid line 728 can be considered an S1-U bearer and solid line 732 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 704 can include various signaling bearer paths/interfaces, e.g., control plane paths/interfaces represented by dashed lines 730, 734, 736, and 738. Some of the signaling bearer paths may be referred to by a specific label. For example, dashed line 730 can be considered as an S1-MME signaling bearer, dashed line 734 can be considered as an S11 signaling bearer and dashed line 736 can be considered an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 766. In the illustrative example, the S1-U+ user plane interface extends between the eNB 716a and PGW 726. Notably, S1-U+ path/interface does not include SGW 720, a node that is otherwise instrumental in configuring and/or managing packet forwarding between eNB 716a and one or more external networks 706 by way of PGW 726. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 720, 726 due to excessive handover events.

In some embodiments, PGW 726 is coupled to storage device 740, shown in phantom. Storage device 740 can be integral to one of the network nodes, such as PGW 726, for example, in the form of internal memory and/or disk drive. It is understood that storage device 740 can include registers suitable for storing address values. Alternatively or in addition, storage device 740 can be separate from PGW 726, for example, as an external hard drive, a flash drive, and/or network storage.

Storage device 740 selectively stores one or more values relevant to the forwarding of packet data. For example, storage device 740 can store identities and/or addresses of network entities, such as any of network nodes 718, 720, 722, 724, and 726, eNBs 716 and/or UE 714. In the illustrative example, storage device 740 includes a first storage location 742 and a second storage location 744. First storage location 742 can be dedicated to storing a Currently Used Downlink address value 742. Likewise, second storage location 744 can be dedicated to storing a Default Downlink Forwarding address value 744. PGW 726 can read and/or write values into either of storage locations 742, 744, for example, managing Currently Used Downlink Forwarding address value 742 and Default Downlink Forwarding address value 744 as disclosed herein.

In some embodiments, the Default Downlink Forwarding address for each EPS bearer is the SGW S5-U address for each EPS Bearer. The Currently Used Downlink Forwarding address" for each EPS bearer in PGW 726 can be set every time when PGW 726 receives an uplink packet, e.g., a GTP-U uplink packet, with a new source address for a corresponding EPS bearer. When UE 714 is in an idle state, the "Current Used Downlink Forwarding address" field for each EPS bearer of UE 714 can be set to a "null" or other suitable value.

In some embodiments, the Default Downlink Forwarding address is only updated when PGW 726 receives a new SGW S5-U address in a predetermined message or messages. For example, the Default Downlink Forwarding address is only updated when PGW 726 receives one of a Create Session Request, Modify Bearer Request and Create Bearer Response messages from SGW 720.

As values 742, 744 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 702 and core network 704 are illustrated in a simplified block diagram in FIG. 7. In other words, either or both of access network 702 and the core network 704 can include additional network elements that are not shown, such as various routers, switches and controllers. In addition, although FIG. 7 illustrates only a single one of each of the various network elements, it should be noted that access network 702 and core network 704 can include any number of the various network elements. For example, core network 704 can include a pool (i.e., more than one) of MMEs 718, SGWs 720 or PGWs 726.

In the illustrative example, data traversing a network path between UE 714, eNB 716a, SGW 720, PGW 726 and external network 706 may be considered to constitute data transferred according to an end-to-end IP service. However, for the present disclosure, to properly perform establishment management in LTE-EPS network architecture 700, the core network, data bearer portion of the end-to-end IP service is analyzed.

An establishment may be defined herein as a connection set up request between any two elements within LTE-EPS network architecture 700. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 746) between UE 714 and eNB 716a, a second portion (e.g., an S1 data bearer 728) between eNB 716a and SGW 720, and a third portion (e.g., an S5/S8 bearer 732) between SGW 720 and PGW 726. Various signaling bearer portions are also illustrated in FIG. 7. For example, a first signaling portion (e.g., a signaling radio bearer 748) between UE 714 and eNB 716a, and a second signaling portion (e.g., S1 signaling bearer 730) between eNB 716a and MME 718.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 700, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 750 includes a first tunnel 752a between two tunnel endpoints 754a and 756a, and a second tunnel 752b between two tunnel endpoints 754b and 756b. In the illustrative example, first tunnel 752a is established between eNB 716a and SGW 720. Accordingly, first tunnel 752a includes a first tunnel endpoint 754a corresponding to an S1-U address of eNB 716a (referred to herein as the eNB S1-U address), and second tunnel endpoint 756a corresponding to an S1-U address of SGW 720 (referred to herein as the SGW S1-U address). Likewise, second tunnel 752b includes first tunnel endpoint 754b corresponding to an S5-U address of SGW 720 (referred to herein as the SGW S5-U address), and second tunnel endpoint 756b corresponding to an S5-U address of PGW 726 (referred to herein as the PGW S5-U address).

In at least some embodiments, first tunnel solution 750 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 758 includes a single or direct tunnel 760 between tunnel endpoints 762 and 764. In the illustrative example, direct tunnel 760 is established between eNB 716a and PGW 726, without subjecting packet transfers to processing related to SGW 720. Accordingly, direct tunnel 760 includes first tunnel endpoint 762 corresponding to the eNB S1-U address, and second tunnel endpoint 764 corresponding to the PGW S5-U address. Packet data received at either end can be encapsulated into a payload and directed to the corresponding address of the other end of the tunnel. Such direct tunneling avoids processing, e.g., by SGW 720 that would otherwise relay packets between the same two endpoints, e.g., according to a protocol, such as the GTP-U protocol.

In some scenarios, direct tunneling solution 758 can forward user plane data packets between eNB 716a and PGW 726, by way of SGW 720. That is, SGW 720 can serve a relay function, by relaying packets between two tunnel endpoints 716a, 726. In other scenarios, direct tunneling solution 758 can forward user data packets between eNB 716a and PGW 726, by way of the S1 U+ interface, thereby bypassing SGW 720.

Generally, UE 714 can have one or more bearers at any one time. The number and types of bearers can depend on applications, default requirements, and so on. It is understood that the techniques disclosed herein, including the configuration, management and use of various tunnel solutions 750, 758, can be applied to the bearers on an individual bases. That is, if user data packets of one bearer, say a bearer associated with a VoIP service of UE 714, then the forwarding of all packets of that bearer are handled in a similar manner Continuing with this example, the same UE 714 can have another bearer associated with it through the same eNB 716a. This other bearer, for example, can be associated with a relatively low rate data session forwarding user data packets through core network 704 simultaneously with the first bearer. Likewise, the user data packets of the other bearer are also handled in a similar manner, without necessarily following a forwarding path or solution of the first bearer. Thus, one of the bearers may be forwarded through direct tunnel 758; whereas, another one of the bearers may be forwarded through a two-tunnel solution 750.

Figure 8:
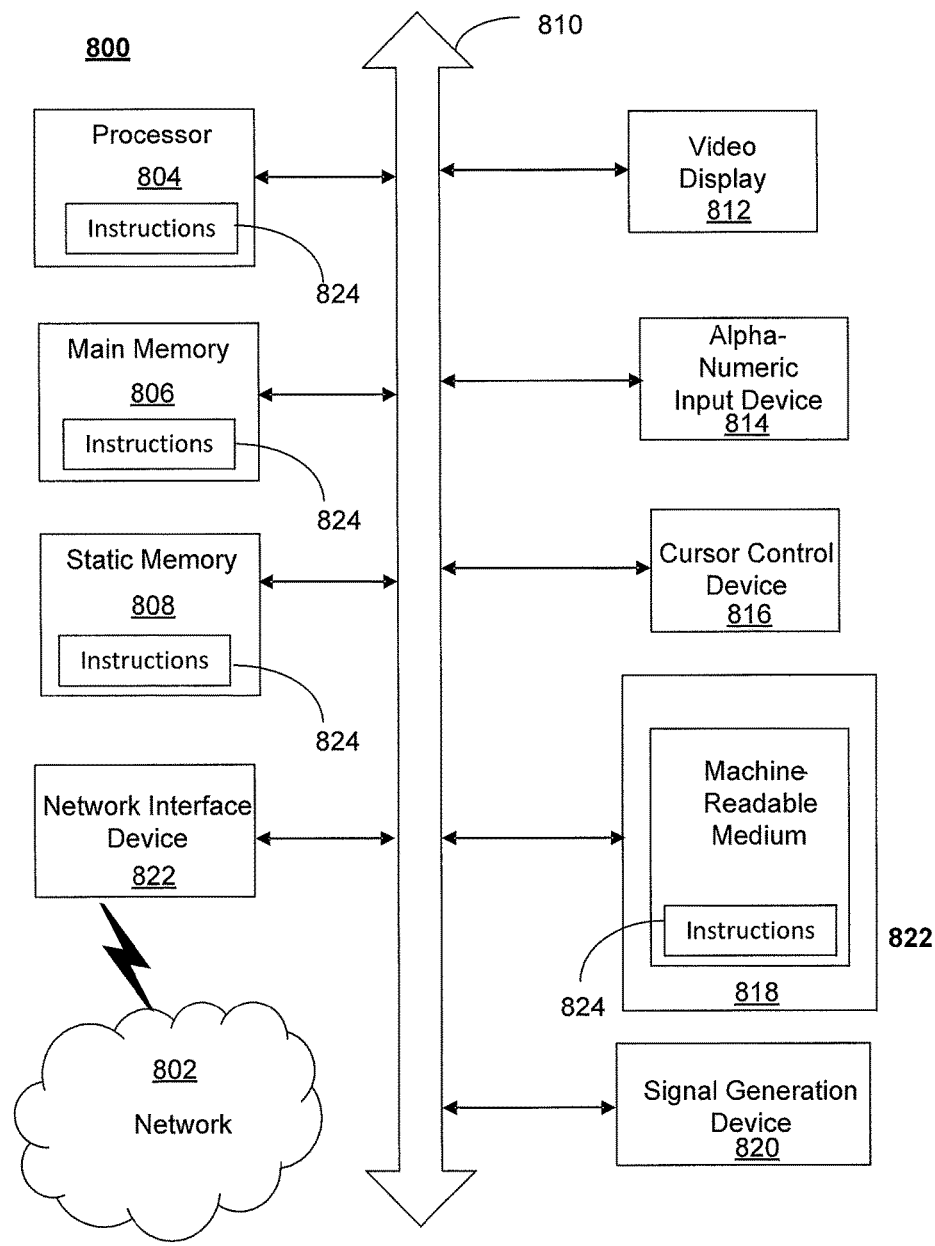
FIG. 8 depicts an exemplary communication system that provide wireless telecommunication services over wireless communication networks.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as processor 212, UE 714, eNB 716, MME 718, SGW 720, HSS 722, PCRF 724, PGW 726 and other devices described herein. In some embodiments, the machine may be connected (e.g., using a network 802) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 800 may include a processor (or controller) 804 (e.g., a central processing unit (CPU)), a graphics processing unit (GPU, or both), a main memory 806 and a static memory 808, which communicate with each other via a bus 810. The computer system 800 may further include a display unit 812 (e.g., a liquid crystal display (LCD), a flat panel, or a solid state display). Computer system 800 may include an input device 814 (e.g., a keyboard), a cursor control device 816 (e.g., a mouse), a disk drive unit 818, a signal generation device 820 (e.g., a speaker or remote control) and a network interface device 822. In distributed environments, the embodiments described in the subject disclosure can be adapted to utilize multiple display units 812 controlled by two or more computer systems 800. In this configuration, presentations described by the subject disclosure may in part be shown in a first of display units 812, while the remaining portion is presented in a second of display units 812.

The disk drive unit 818 may include a tangible computer-readable storage medium 824 on which is stored one or more sets of instructions (e.g., software 826) embodying any one or more of the methods or functions described herein, including those methods illustrated above. Instructions 826 may also reside, completely or at least partially, within main memory 806, static memory 808, or within processor 804 during execution thereof by the computer system 800. Main memory 806 and processor 804 also may constitute tangible computer-readable storage media.

Figure 9:
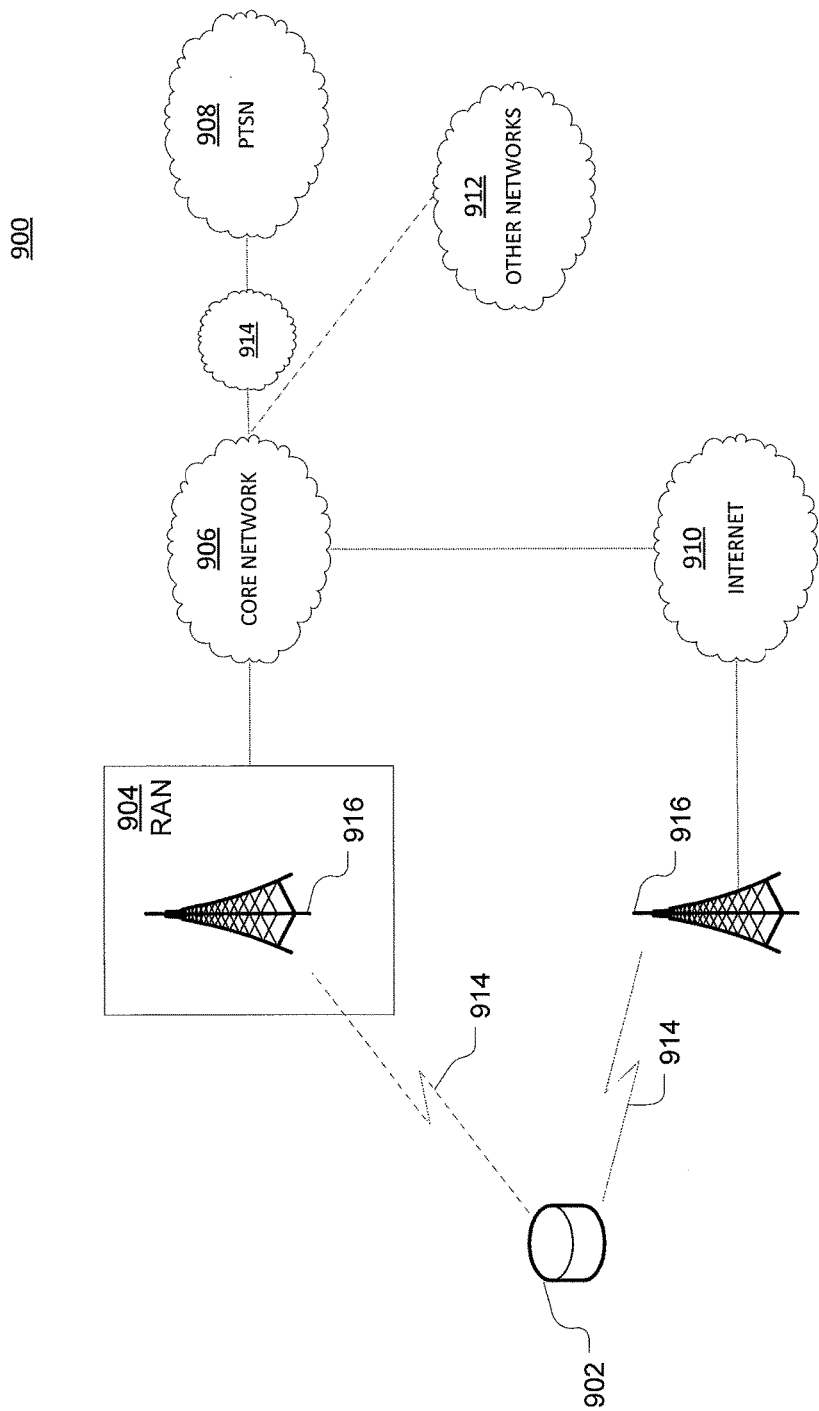
FIG. 9 is a diagram of an exemplary telecommunications system in which the disclosed methods and processes may be implemented.

As shown in FIG. 9, telecommunication system 900 may include wireless transmit/receive units (WTRUs) 902, a RAN 904, a core network 906, a public switched telephone network (PSTN) 908, the Internet 910, or other networks 912, though it will be appreciated that the disclosed examples contemplate any number of WTRUs, base stations, networks, or network elements. Each WTRU 902 may be any type of device configured to operate or communicate in a wireless environment. For example, a WTRU may comprise a mobile device, network device 210, servers/racks or components thereof, or the like, or any combination thereof. By way of example, WTRUs 902 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 902 may be configured to transmit or receive wireless signals over an air interface 914.

Telecommunication system 900 may also include one or more base stations 916. Each of base stations 916 may be any type of device configured to wirelessly interface with at least one of the WTRUs 902 to facilitate access to one or more communication networks, such as core network 906, PTSN 908, Internet 910, or other networks 912. By way of example, base stations 916 may be a base transceiver station (BTS), a Node-B, an eNode B, a Home Node B, a Home eNode B, a site controller, an access point (AP), a wireless router, or the like. While base stations 916 are each depicted as a single element, it will be appreciated that base stations 916 may include any number of interconnected base stations or network elements.

RAN 904 may include one or more base stations 916, along with other network elements (not shown), such as a base station controller (BSC), a radio network controller (RNC), or relay nodes. One or more base stations 916 may be configured to transmit or receive wireless signals within a particular geographic region, which may be referred to as a cell (not shown). The cell may further be divided into cell sectors. For example, the cell associated with base station 916 may be divided into three sectors such that base station 916 may include three transceivers: one for each sector of the cell. In another example, base station 916 may employ multiple-input multiple-output (MIMO) technology and, therefore, may utilize multiple transceivers for each sector of the cell.

Base stations 916 may communicate with one or more of WTRUs 902 over air interface 914, which may be any suitable wireless communication link (e.g., RF, microwave, infrared (IR), ultraviolet (UV), or visible light). Air interface 914 may be established using any suitable radio access technology (RAT).

More specifically, as noted above, telecommunication system 900 may be a multiple access system and may employ one or more channel access schemes, such as CDMA, TDMA, FDMA, OFDMA, SC-FDMA, or the like. For example, base station 916 in RAN 904 and WTRUs 902 connected to RAN 904 may implement a radio technology such as Universal Mobile Telecommunications System (UMTS) Terrestrial Radio Access (UTRA) that may establish air interface 914 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 916 and WTRUs 902 that are connected to RAN 904 may implement a radio technology such as Evolved UMTS Terrestrial Radio Access (E-UTRA), which may establish air interface 914 using LTE or LTE-Advanced (LTE-A).

Optionally base station 916 and WTRUs 902 connected to RAN 904 may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 916 may be a wireless router, Home Node B, Home eNode B, or access point, for example, and may utilize any suitable RAT for facilitating wireless connectivity in a localized area, such as a place of business, a home, a vehicle, a campus, or the like. For example, base station 916 and associated WTRUs 902 may implement a radio technology such as IEEE 802.11 to establish a wireless local area network (WLAN). As another example, base station 916 and associated WTRUs 902 may implement a radio technology such as IEEE 802.15 to establish a wireless personal area network (WPAN). In yet another example, base station 916 and associated WTRUs 902 may utilize a cellular-based RAT (e.g., WCDMA, CDMA2000, GSM, LTE, LTE-A, etc.) to establish a picocell or femtocell. As shown in FIG. 9, base station 916 may have a direct connection to Internet 910. Thus, base station 916 may not be required to access Internet 910 via core network 906.

RAN 904 may be in communication with core network 906, which may be any type of network configured to provide voice, data, applications, and/or voice over internet protocol (VoIP) services to one or more WTRUs 902. For example, core network 906 may provide call control, billing services, mobile location-based services, pre-paid calling, Internet connectivity, video distribution or high-level security functions, such as user authentication. Although not shown in FIG. 9, it will be appreciated that RAN 904 or core network 906 may be in direct or indirect communication with other RANs that employ the same RAT as RAN 904 or a different RAT. For example, in addition to being connected to RAN 904, which may be utilizing an E-UTRA radio technology, core network 906 may also be in communication with another RAN (not shown) employing a GSM radio technology.

Core network 906 may also serve as a gateway for WTRUs 902 to access PSTN 908, Internet 910, or other networks 912. PSTN 908 may include circuit-switched telephone networks that provide plain old telephone service (POTS). For LTE core networks, core network 906 may use IMS core 914 to provide access to PSTN 908. Internet 910 may include a global system of interconnected computer networks or devices that use common communication protocols, such as the transmission control protocol (TCP), user datagram protocol (UDP), or IP in the TCP/IP internet protocol suite. Other networks 912 may include wired or wireless communications networks owned or operated by other service providers. For example, other networks 912 may include another core network connected to one or more RANs, which may employ the same RAT as RAN 904 or a different RAT.

Some or all WTRUs 902 in telecommunication system 900 may include multi-mode capabilities. That is, WTRUs 902 may include multiple transceivers for communicating with different wireless networks over different wireless links. For example, one or more WTRUs 902 may be configured to communicate with base station 916, which may employ a cellular-based radio technology, and with base station 916, which may employ an IEEE 802 radio technology.

Figure 10:
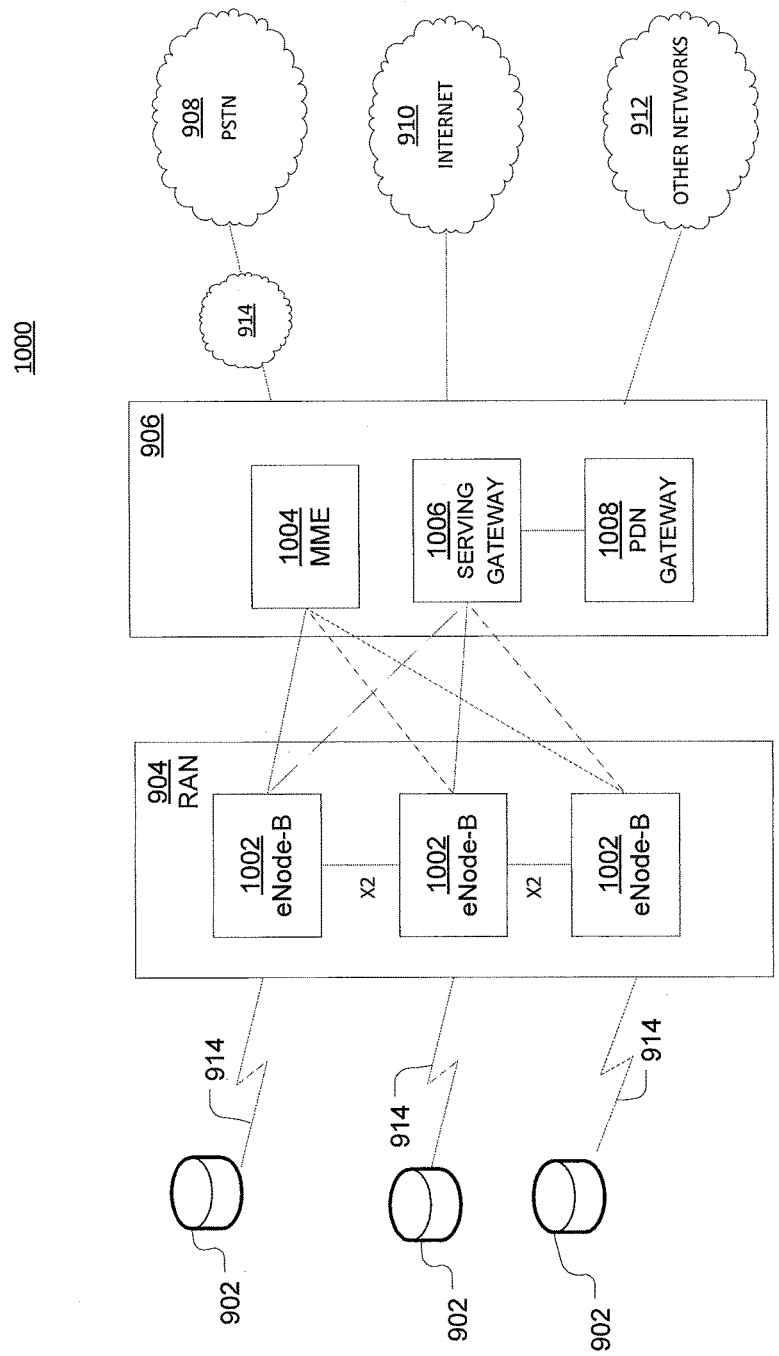
FIG. 10 is an example system diagram of a radio access network and a core network.

FIG. 10 is an example system 1000 including RAN 904 and core network 906. As noted above, RAN 904 may employ an E-UTRA radio technology to communicate with WTRUs 902 over air interface 914. RAN 904 may also be in communication with core network 906.

RAN 904 may include any number of eNode-Bs 1002 while remaining consistent with the disclosed technology. One or more eNode-Bs 1002 may include one or more transceivers for communicating with the WTRUs 902 over air interface 914. Optionally, eNode-Bs 1002 may implement MIMO technology. Thus, one of eNode-Bs 1002, for example, may use multiple antennas to transmit wireless signals to, or receive wireless signals from, one of WTRUs 902.

Each of eNode-Bs 1002 may be associated with a particular cell (not shown) and may be configured to handle radio resource management decisions, handover decisions, scheduling of users in the uplink or downlink, or the like. As shown in FIG. 10 eNode-Bs 1002 may communicate with one another over an X2 interface.

Core network 906 shown in FIG. 10 may include a mobility management gateway or entity (MME) 1004, a serving gateway 1006, or a packet data network (PDN) gateway 1008. While each of the foregoing elements are depicted as part of core network 906, it will be appreciated that any one of these elements may be owned or operated by an entity other than the core network operator.

MME 1004 may be connected to each of eNode-Bs 1002 in RAN 904 via an S1 interface and may serve as a control node. For example, MME 1004 may be responsible for authenticating users of WTRUs 902, bearer activation or deactivation, selecting a particular serving gateway during an initial attach of WTRUs 902, or the like. MME 1004 may also provide a control plane function for switching between RAN 904 and other RANs (not shown) that employ other radio technologies, such as GSM or WCDMA.

Serving gateway 1006 may be connected to each of eNode-Bs 1002 in RAN 904 via the S1 interface. Serving gateway 1006 may generally route or forward user data packets to or from the WTRUs 902. Serving gateway 1006 may also perform other functions, such as anchoring user planes during inter-eNode B handovers, triggering paging when downlink data is available for WTRUs 902, managing or storing contexts of WTRUs 902, or the like.

Serving gateway 1006 may also be connected to PDN gateway 1008, which may provide WTRUs 902 with access to packet-switched networks, such as Internet 910, to facilitate communications between WTRUs 902 and IP-enabled devices.

Core network 906 may facilitate communications with other networks. For example, core network 906 may provide WTRUs 902 with access to circuit-switched networks, such as PSTN 908, such as through IMS core 914, to facilitate communications between WTRUs 902 and traditional landline communications devices. In addition, core network 906 may provide the WTRUs 902 with access to other networks 912, which may include other wired or wireless networks that are owned or operated by other service providers.

Figure 11:
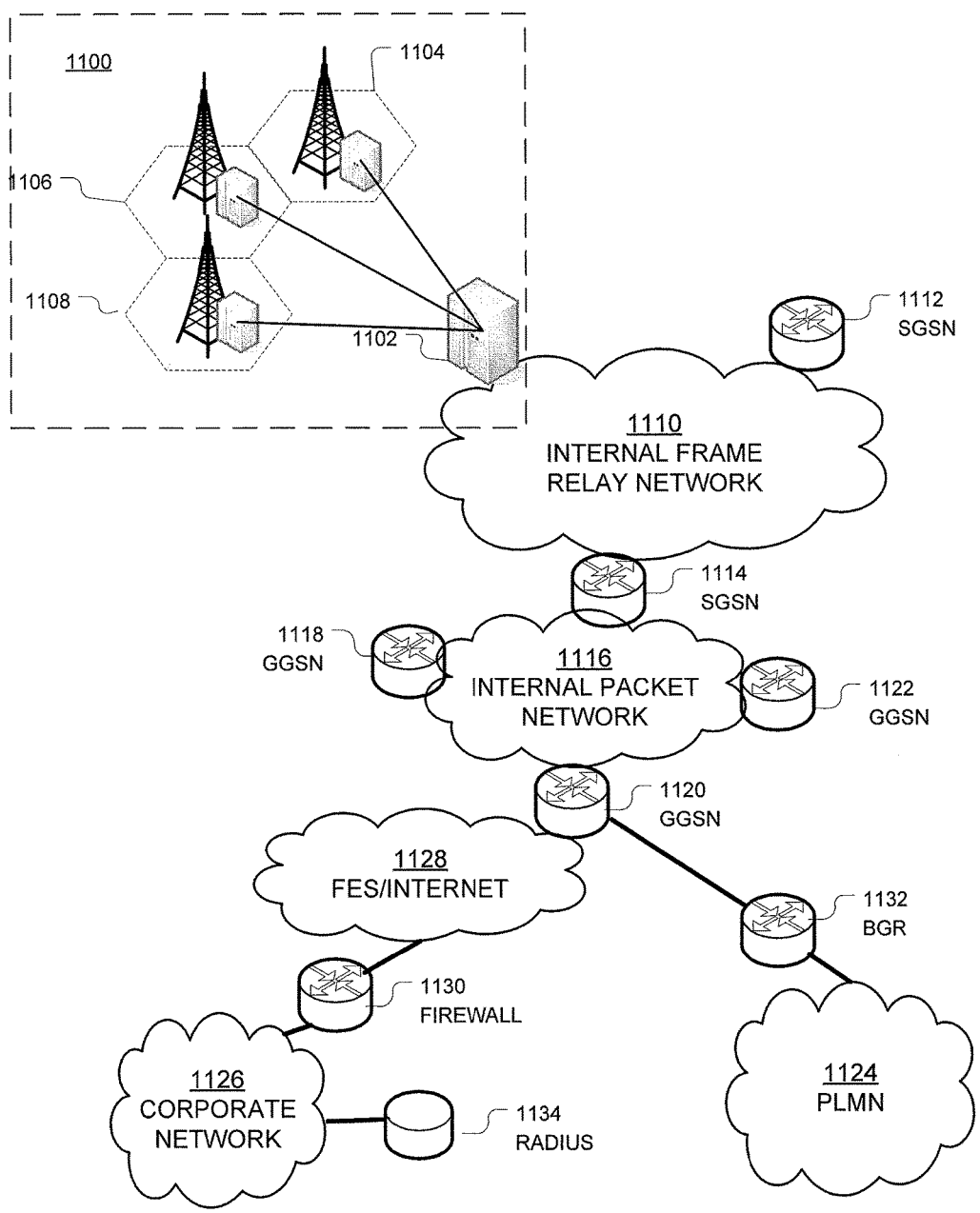
FIG. 11 illustrates an overall block diagram of an example packet-based mobile cellular network environment, such as a general packet radio service (GPRS) network.

FIG. 11 depicts an overall block diagram of an example packet-based mobile cellular network environment, such as a GPRS network as described herein. In the example packet-based mobile cellular network environment shown in FIG. 11, there are a plurality of base station subsystems (BSS) 1100 (only one is shown), each of which comprises a base station controller (BSC) 1102 serving a plurality of BTSs, such as BTSs 1104, 1106, 1108. BTSs 1104, 1106, 1108 are the access points where users of packet-based mobile devices become connected to the wireless network. In example fashion, the packet traffic originating from mobile devices is transported via an over-the-air interface to BTS 1108, and from BTS 1108 to BSC 1102. Base station subsystems, such as BSS 1100, are a part of internal frame relay network 1110 that can include a service GPRS support nodes (SGSN), such as SGSN 1112 or SGSN 1114. Each SGSN 1112, 1114 is connected to an internal packet network 1116 through which SGSN 1112, 1114 can route data packets to or from a plurality of gateway GPRS support nodes (GGSN) 1118, 1120, 1122. As illustrated, SGSN 1114 and GGSNs 1118, 1120, 1122 are part of internal packet network 1116. GGSNs 1118, 1120, 1122 mainly provide an interface to external IP networks such as PLMN 1124, corporate intranets/internets 1126, or Fixed-End System (FES) or the public Internet 1128. As illustrated, subscriber corporate network 1126 may be connected to GGSN 1120 via a firewall 1130. PLMN 1124 may be connected to GGSN 1120 via a boarder gateway router (BGR) 1132. A Remote Authentication Dial-In User Service (RADIUS) server 1134 may be used for caller authentication when a user calls corporate network 1126.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 12:
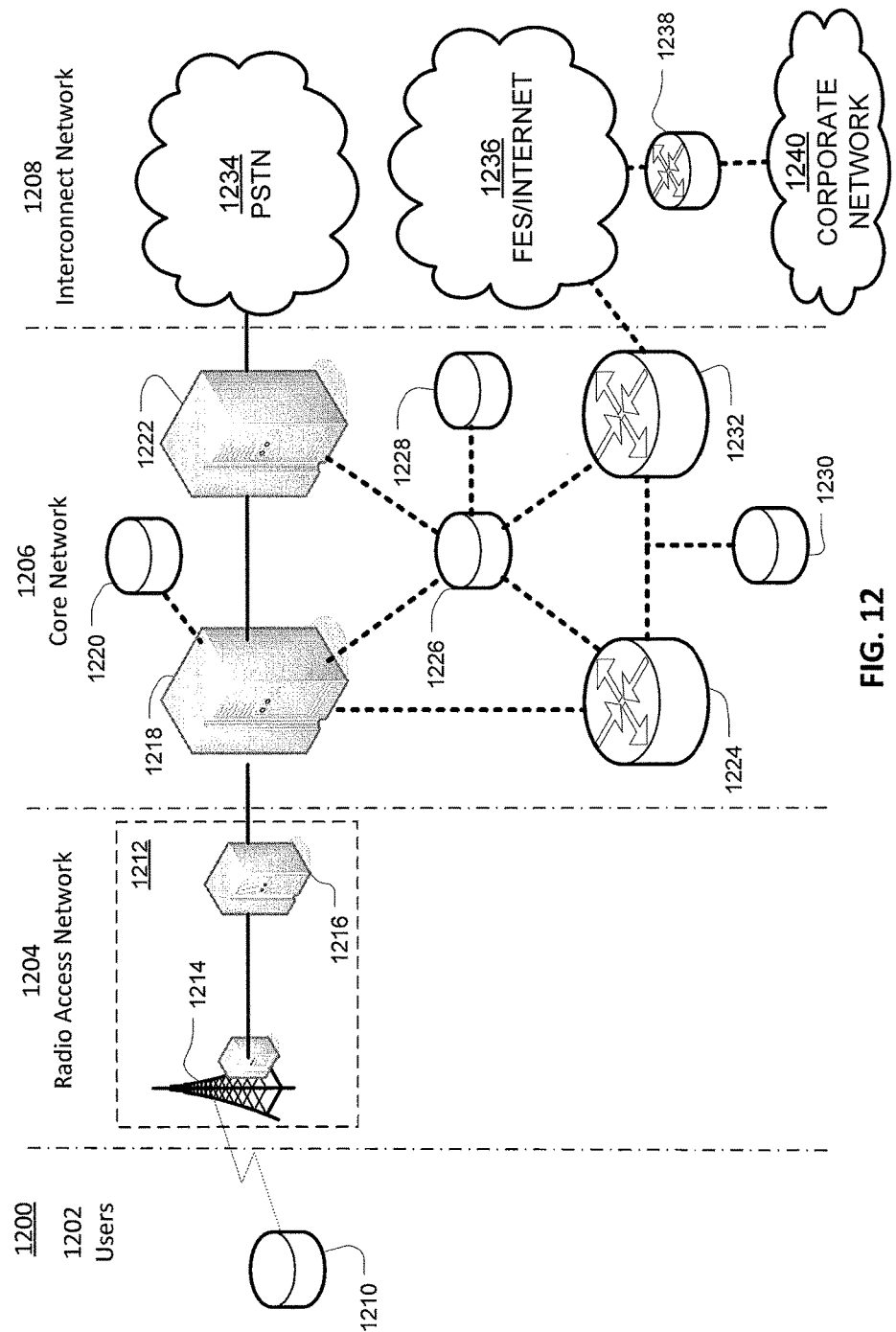
FIG. 12 illustrates an exemplary architecture of a GPRS network.

FIG. 12 illustrates an architecture of a typical GPRS network 1200 as described herein. The architecture depicted in FIG. 12 may be segmented into four groups: users 1202, RAN 1204, core network 1206, and interconnect network 1208. Users 1202 comprise a plurality of end users, who each may use one or more devices 1210. Note that device 1210 is referred to as a mobile subscriber (MS) in the description of network shown in FIG. 12. In an example, device 1210 comprises a communications device (e.g., mobile device, network device 210, racks/servers or components thereof, or the like, or any combination thereof). Radio access network 1204 comprises a plurality of BSSs such as BSS 1212, which includes a BTS 1214 and a BSC 1216. Core network 1206 may include a host of various network elements. As illustrated in FIG. 12, core network 1206 may comprise MSC 1218, service control point (SCP) 1220, gateway MSC (GMSC) 1222, SGSN 1224, home location register (HLR) 1226, authentication center (AuC) 1228, domain name system (DNS) server 1230, and GGSN 1232. Interconnect network 1208 may also comprise a host of various networks or other network elements. As illustrated in FIG. 12, interconnect network 1208 comprises a PSTN 1234, an FES/Internet 1236, a firewall 1038, or a corporate network 1240.

An MSC can be connected to a large number of BSCs. At MSC 1218, for instance, depending on the type of traffic, the traffic may be separated in that voice may be sent to PSTN 1234 through GMSC 1222, or data may be sent to SGSN 1224, which then sends the data traffic to GGSN 1232 for further forwarding.

When MSC 1218 receives call traffic, for example, from BSC 1216, it sends a query to a database hosted by SCP 1220, which processes the request and issues a response to MSC 1218 so that it may continue call processing as appropriate.

HLR 1226 is a centralized database for users to register to the GPRS network. HLR 1226 stores static information about the subscribers such as the International Mobile Subscriber Identity (IMSI), subscribed services, or a key for authenticating the subscriber. HLR 1226 also stores dynamic subscriber information such as the current location of the MS. Associated with HLR 1226 is AuC 1228, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 12, when MS 1210 initiates the attach process by turning on the network capabilities of the mobile device, an attach request is sent by MS 1210 to SGSN 1224. The SGSN 1224 queries another SGSN, to which MS 1210 was attached before, for the identity of MS 1210. Upon receiving the identity of MS 1210 from the other SGSN, SGSN 1224 requests more information from MS 1210. This information is used to authenticate MS 1210 together with the information provided by HLR 1226. Once verified, SGSN 1224 sends a location update to HLR 1226 indicating the change of location to a new SGSN, in this case SGSN 1224. HLR 1226 notifies the old SGSN, to which MS 1210 was attached before, to cancel the location process for MS 1210. HLR 1226 then notifies SGSN 1224 that the location update has been performed. At this time, SGSN 1224 sends an Attach Accept message to MS 1210, which in turn sends an Attach Complete message to SGSN 1224.

Next, MS 1210 establishes a user session with the destination network, corporate network 1240, by going through a Packet Data Protocol (PDP) activation process. Briefly, in the process, MS 1210 requests access to the Access Point Name (APN), for example, UPS.com, and SGSN 1224 receives the activation request from MS 1210. SGSN 1224 then initiates a DNS query to learn which GGSN 1232 has access to the UPS.com APN. The DNS query is sent to a DNS server within core network 1206, such as DNS server 1230, which is provisioned to map to one or more GGSNs in core network 1206. Based on the APN, the mapped GGSN 1232 can access requested corporate network 1240. SGSN 1224 then sends to GGSN 1232 a Create PDP Context Request message that contains necessary information. GGSN 1232 sends a Create PDP Context Response message to SGSN 1224, which then sends an Activate PDP Context Accept message to MS 1210

Once activated, data packets of the call made by MS 1210 can then go through RAN 1204, core network 1206, and interconnect network 1208, in a particular FES/Internet 1236 and firewall 1038, to reach corporate network 1240.

Figure 13:
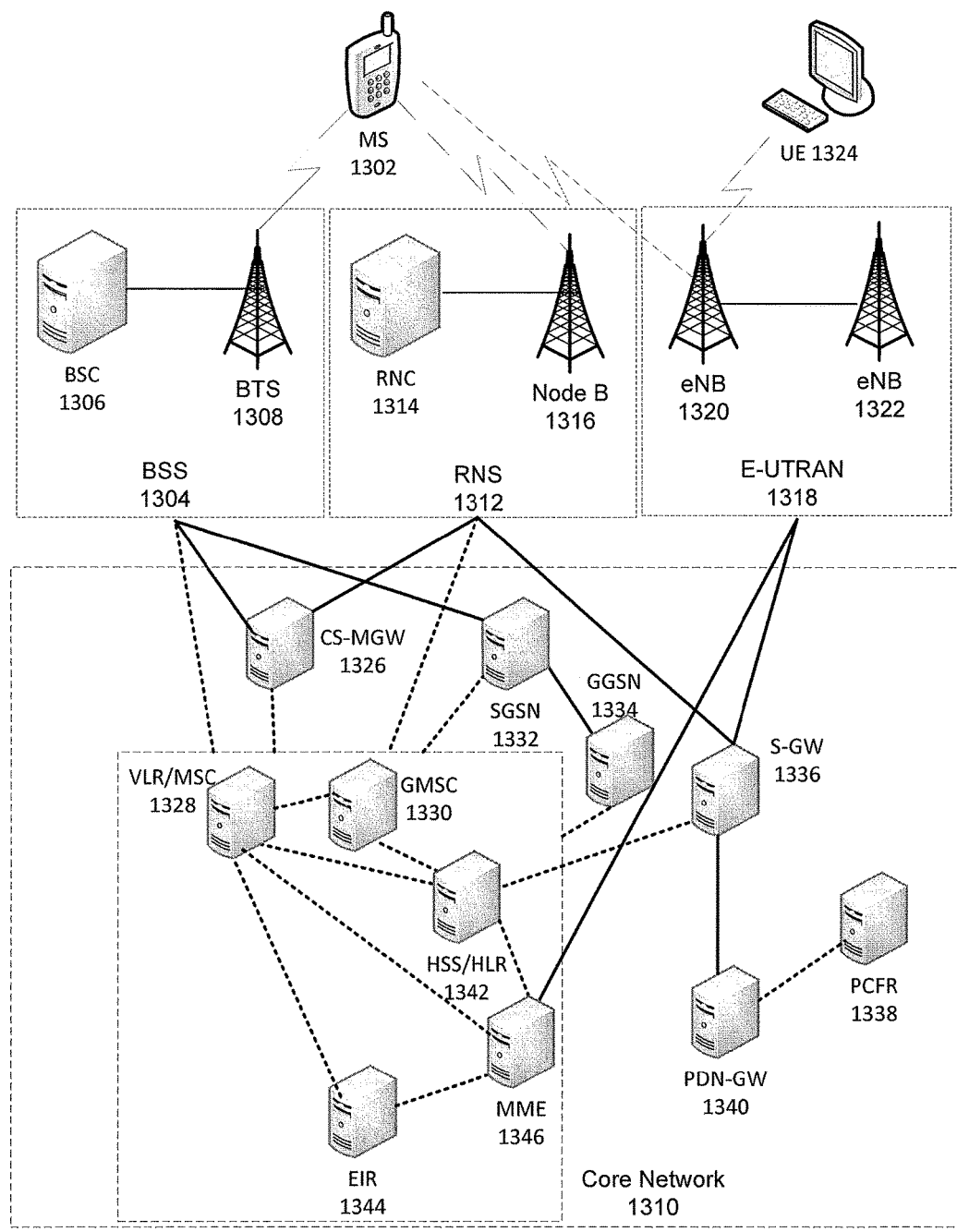
FIG. 13 is a block diagram of an exemplary public land mobile network (PLMN).

FIG. 13 illustrates a PLMN block diagram view of an example architecture that may be replaced by a telecommunications system. In FIG. 13, solid lines may represent user traffic signals, and dashed lines may represent support signaling. MS 1302 is the physical equipment used by the PLMN subscriber. For example, drone 132, network device 300, the like, or any combination thereof may serve as MS 1302. MS 1302 may be one of, but not limited to, a cellular telephone, a cellular telephone in combination with another electronic device or any other wireless mobile communication device.

MS 1302 may communicate wirelessly with BSS 1304. BSS 1304 contains BSC 1306 and a BTS 1308. BSS 1304 may include a single BSC 1306/BTS 1308 pair (base station) or a system of BSC/BTS pairs that are part of a larger network. BSS 1304 is responsible for communicating with MS 1302 and may support one or more cells. BSS 1304 is responsible for handling cellular traffic and signaling between MS 1302 and a core network 1310. Typically, BSS 1304 performs functions that include, but are not limited to, digital conversion of speech channels, allocation of channels to mobile devices, paging, or transmission/reception of cellular signals.

Additionally, MS 1302 may communicate wirelessly with RNS 1312. RNS 1312 contains a Radio Network Controller (RNC) 1314 and one or more Nodes B 1316. RNS 1312 may support one or more cells. RNS 1312 may also include one or more RNC 1314/Node B 1316 pairs or alternatively a single RNC 1314 may manage multiple Nodes B 1316. RNS 1312 is responsible for communicating with MS 1302 in its geographically defined area. RNC 1314 is responsible for controlling Nodes B 1316 that are connected to it and is a control element in a UMTS radio access network. RNC 1314 performs functions such as, but not limited to, load control, packet scheduling, handover control, security functions, or controlling MS 1302 access to core network 1310.

An E-UTRA Network (E-UTRAN) 1318 is a RAN that provides wireless data communications for MS 1302 and UE 1324. E-UTRAN 1318 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1318 may include of series of logical network components such as E-UTRAN Node B (eNB) 1320 and E-UTRAN Node B (eNB) 1322. E-UTRAN 1318 may contain one or more eNBs. User equipment (UE) 1324 may be any mobile device capable of connecting to E-UTRAN 1318 including, but not limited to, a personal computer, laptop, mobile device, wireless router, or other device capable of wireless connectivity to E-UTRAN 1318. The improved performance of the E-UTRAN 1318 relative to a typical UMTS network allows for increased bandwidth, spectral efficiency, and functionality including, but not limited to, voice, high-speed applications, large data transfer or IPTV, while still allowing for full mobility.

Typically MS 1302 may communicate with any or all of BSS 1304, RNS 1312, or E-UTRAN 1318. In a illustrative system, each of BSS 1304, RNS 1312, and E-UTRAN 1318 may provide MS 1302 with access to core network 1310. Core network 1310 may include of a series of devices that route data and communications between end users. Core network 1310 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1326 is part of core network 1310, and interacts with VLR/MSC server 1328 and GMSC server 1330 in order to facilitate core network 1310 resource control in the CS domain. Functions of CS-MGW 1326 include, but are not limited to, media conversion, bearer control, payload processing or other mobile network processing such as handover or anchoring. CS-MGW 1326 may receive connections to MS 1302 through BSS 1304 or RNS 1312.

SGSN 1332 stores subscriber data regarding MS 1302 in order to facilitate network functionality. SGSN 1332 may store subscription information such as, but not limited to, the IMSI, temporary identities, or PDP addresses. SGSN 1332 may also store location information such as, but not limited to, GGSN address for each GGSN 1334 where an active PDP exists. GGSN 1334 may implement a location register function to store subscriber data it receives from SGSN 1332 such as subscription or location information.

Serving gateway (S-GW) 1336 is an interface which provides connectivity between E-UTRAN 1318 and core network 1310. Functions of S-GW 1336 include, but are not limited to, packet routing, packet forwarding, transport level packet processing, or user plane mobility anchoring for inter-network mobility. PCRF 1338 uses information gathered from P-GW 1336, as well as other sources, to make applicable policy and charging decisions related to data flows, network resources or other network administration functions. PDN gateway (PDN-GW) 1340 may provide user-to-services connectivity functionality including, but not limited to, GPRS/EPC network anchoring, bearer session anchoring and control, or IP address allocation for PS domain connections.

HSS 1342 is a database for user information and stores subscription data regarding MS 1302 or UE 1324 for handling calls or data sessions. Networks may contain one HSS 1342 or more if additional resources are required. Example data stored by HSS 1342 include, but is not limited to, user identification, numbering or addressing information, security information, or location information. HSS 1342 may also provide call or session establishment procedures in both the PS and CS domains.

VLR/MSC Server 1328 provides user location functionality. When MS 1302 enters a new network location, it begins a registration procedure. A MSC server for that location transfers the location information to the VLR for the area. A VLR and MSC server may be located in the same computing environment, as is shown by VLR/MSC server 1328, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1302 registration or procedures for handover of MS 1302 to a different section of core network 1310. GMSC server 1330 may serve as a connection to alternate GMSC servers for other MSs in larger networks.

EIR 1344 is a logical element which may store the IMEI for MS 1302. User equipment may be classified as either "white listed" or "black listed" depending on its status in the network. If MS 1302 is stolen and put to use by an unauthorized user, it may be registered as "black listed" in EIR 1344, preventing its use on the network. A MME 1346 is a control node which may track MS 1302 or UE 1324 if the devices are idle. Additional functionality may include the ability of MME 1346 to contact idle MS 1302 or UE 1324 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While examples of network environments, such as data centers, in which traffic management techniques herein can be implemented have been described in connection with various computing devices/processors, the underlying concepts may be applied to other environments, networks, computing devices, processors, or systems subject to similar requirements and constraints. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The systems, methods, and/or techniques associated with a traffic management described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While techniques herein are described in connection with the various examples of the various figures, it is to be understood that other similar implementations may be used, or modifications and additions may be made to the described example techniques, without deviating from the scope or spirit of the innovation. For example, one skilled in the art will recognize that a traffic management technique herein may apply to environments other than those expressly identified, whether wired or wireless, and may be applied to any number of such environments via a communications network and interacting across the network. Therefore, traffic management as described herein should not be limited to any single example, but rather should be construed in breadth and scope in accordance with the appended claims and the entirety of the disclosure.

In describing preferred methods, systems, or apparatuses of the subject matter of the present disclosure—traffic management—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method, comprising:
executing, using a processor, computer code stored on a non-transitory computer readable media, wherein the code when executed effectuates operations comprising:
sorting a plurality of heterogeneous background tasks according to remaining time flexibility for each of the plurality of heterogeneous background tasks, wherein the plurality of heterogeneous background tasks comprise at least one of a repair task, a rebalance task, a backup task, and a recovery task;
selecting prioritized background tasks from the plurality of heterogeneous background tasks based on respective remaining time flexibility of the prioritized background tasks being less than a threshold value;
assigning resources to the prioritized background tasks using a linear programming model, wherein the linear programming model models utilization of the resources, wherein a constraint of the linear programming model is network topology, wherein the network topology comprises at least one of service bandwidth capacity, top-of-rack bandwidth capacity, and aggregator bandwidth capacity, and wherein at least one non-prioritized task among the plurality of heterogeneous background tasks does not receive resources in a current iteration; and
executing the prioritized background tasks until one of the prioritized background tasks reaches a task end, wherein the task end is either completion of the one of the prioritized background tasks or expiration of remaining time flexibility for the one of the prioritized background tasks.

2. The method of claim 1, wherein the resources include bandwidth.

3. The method of claim 1, wherein the operations further comprise:
receiving at least one additional task that is added to the plurality of heterogeneous background tasks; and
repeating the method beginning with sorting based on the task end.

4. The method of claim 3, wherein the operations further comprise:
removing the one of the prioritized background tasks from the plurality of heterogeneous background tasks based on the task end, wherein the one of the prioritized background tasks was completed within its remaining time flexibility.

5. The method of claim 1, expiration of remaining time flexibility includes projected deadline failure.

6. The method of claim 1, wherein the prioritized background tasks are selected based on remaining time flexibility being below a threshold.

7. The method of claim 6, the threshold is based on a type of task.

8. The method of claim 1, wherein a number of prioritized background tasks are selected for resource assignment.

9. The method of claim 8, wherein the number of prioritized tasks selected is dynamic.

10. A system, comprising:
a client node connected to a network including computer readable media;
a plurality of server nodes including computer readable media, the client node performing a background process including a plurality of heterogeneous background tasks in combination with the plurality of server nodes, wherein the plurality of heterogeneous background tasks comprise at least one of a repair task, a rebalance task, a backup task, and a recovery task; and
a background process management component communicatively coupled to at least one of the client node and the plurality of server nodes, wherein the background process management component includes memory comprising instructions that when executed effectuate operations for implementing:
a sort module configured to sort the plurality of heterogeneous background tasks according to remaining time flexibility for each of the plurality of heterogeneous background tasks;
a selection module configured to select prioritized background tasks from the plurality of heterogeneous background tasks for prioritization based on respective remaining time flexibility for the prioritized background tasks; and
an assignment module configured to assign resources to the prioritized background tasks using a linear programming model, wherein the linear programming model models utilization of the resources, wherein a constraint of the linear programming model is network topology, wherein the network topology comprises at least one of service bandwidth capacity, top-of-rack bandwidth capacity, and aggregator bandwidth capacity, and wherein the assignment module is configured to deny resources to at least one non-prioritized task among the plurality of heterogeneous background tasks in a current iteration.

11. The system of claim 10, wherein the resources include bandwidth.

12. The system of claim 10, wherein the plurality of server nodes includes heterogeneous server nodes.

13. The system of claim 10, the prioritized background tasks are selected based on remaining time flexibility being below a threshold.

14. A method, comprising:
executing, using a processor, computer code stored on a non-transitory computer readable media, wherein the code when executed effectuates operations comprising:
a) sorting a plurality of heterogeneous background tasks according to remaining time flexibility for each of the plurality of heterogeneous background tasks, wherein the plurality of heterogeneous background tasks comprise at least one of a repair task, a rebalance task, a backup task, and a recovery task;
b) selecting prioritized background tasks from the plurality of heterogeneous background tasks for prioritization based on respective remaining time flexibility for the prioritized background tasks;
c) assigning resources to the prioritized background tasks using a linear programming model, wherein the linear programming model solving a resource equation as constrained by component constraints, wherein the component constraints include network topology, wherein the network topology comprises at least one of service bandwidth capacity, top-of-rack bandwidth capacity, and aggregator bandwidth capacity, and wherein at least one non-prioritized task among the plurality of heterogeneous background tasks does not receive resources in a current iteration;
d) executing the prioritized background tasks until a task end associated with one of the prioritized background tasks, wherein the task end is either completion of the one of the prioritized background tasks or expiration of remaining time flexibility of the one of the prioritized background tasks; and e) recycling the method to step (a) based on the task end.

15. The method of claim 14, wherein the operations further comprise:
   removing, before recycling the method at step (e), the one of the prioritized background tasks from the plurality of heterogeneous background tasks based on the task end, wherein the one of the prioritized background tasks was completed within its remaining time flexibility.

16. The method of claim 14, wherein the operations further comprise:
   receiving, before recycling the method at step (e), at least one additional task that is added to the plurality of heterogeneous background tasks.

* * * * *